(12) United States Patent
Ueda et al.

(10) Patent No.: US 10,572,394 B2
(45) Date of Patent: Feb. 25, 2020

(54) INFORMATION PROCESSING DEVICE, INFORMATION RECORDING MEDIUM, AND INFORMATION PROCESSING METHOD

(71) Applicant: SONY CORPORATION, Tokyo (JP)

(72) Inventors: Kenjiro Ueda, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 245 days.

(21) Appl. No.: 15/531,264

(22) PCT Filed: Nov. 13, 2015

(86) PCT No.: PCT/JP2015/082033
§ 371 (c)(1),
(2) Date: May 26, 2017

(87) PCT Pub. No.: WO2016/093016
PCT Pub. Date: Jun. 16, 2016

(65) Prior Publication Data
US 2017/0322890 A1     Nov. 9, 2017

(30) Foreign Application Priority Data

Dec. 12, 2014    (JP) ................................ 2014-251789

(51) Int. Cl.
*H04L 29/00*     (2006.01)
*G06F 12/14*     (2006.01)

(52) U.S. Cl.
CPC .. *G06F 12/1408* (2013.01); *G06F 2212/1052* (2013.01)

(58) Field of Classification Search
CPC .......... G06F 12/1408; G11B 20/00086; G11B 20/00188
(Continued)

(56) References Cited

U.S. PATENT DOCUMENTS

2008/0022131 A1    1/2008   Ueda et al.
2009/0041237 A1    2/2009   Takashima et al.

FOREIGN PATENT DOCUMENTS

CN           1825455 A      8/2006
CN         101128834 A      2/2008
(Continued)

OTHER PUBLICATIONS

Extended European Search Report of EP Patent Application No. 15868050.4, dated Jul. 17, 2018, 07 pages.
(Continued)

*Primary Examiner* — Jeffrey C Pwu
*Assistant Examiner* — Michael D Anderson
(74) *Attorney, Agent, or Firm* — Chip Law Group

(57) ABSTRACT

A configuration capable of performing reliable source analysis of illegal copy content using content in which a reproduction path is settable is implemented. Content in which an individual segment region including a plurality of pieces of variation data which include different identification information embedded therein and are decryptable using different keys and a common segment region including single data are provided, and variation data is configured with an aligned unit is set. A content reproducing device calculates a reproduction path by applying a device key and selects and reproduces an aligned unit corresponding to the reproduction path on the basis of a variation data identifier recorded in an adaptation field in a plain text region at the head of a plurality of aligned units constituting the variation data.

16 Claims, 26 Drawing Sheets

(58) Field of Classification Search
USPC .......................................................... 713/193
See application file for complete search history.

(56) References Cited

FOREIGN PATENT DOCUMENTS

| | | | | |
|---|---|---|---|---|
| EP | 1852803 | A1 * | 11/2007 | ....... G11B 20/00086 |
| EP | 1852803 | A1 | 11/2007 | |
| JP | 2006-236120 | A | 9/2006 | |
| JP | 2006-236121 | A | 9/2006 | |
| JP | 2007-043336 | A | 2/2007 | |
| JP | 2011-100474 | A | 5/2011 | |
| JP | 4701748 | B2 | 6/2011 | |
| JP | 2014-023100 | A | 2/2014 | |
| JP | 2014-093689 | A | 5/2014 | |
| MX | PA06001998 | A | 9/2006 | |
| MX | PA06002046 | A | 9/2006 | |
| TW | 200639634 | A | 11/2006 | |
| TW | I390507 | A | 3/2013 | |
| WO | 2006/090627 | A1 | 8/2006 | |

OTHER PUBLICATIONS

Jin, et al., "Traitor Tracing for Prerecorded and Recordable Media", DRM '04, ACM, XP058233917, Oct. 25, 2004, pp. 83-90.

Office Action for JP Patent Application No. 2016-563581, dated Mar. 19, 2019, 03 pages of Office Action and 02 pages of English Translation.

International Search Report and Written Opinion of PCT Application No. PCT/JP2015/082033, dated Feb. 2, 2016, 02 pages of English Translation and 07 pages of ISRWO.

\* cited by examiner

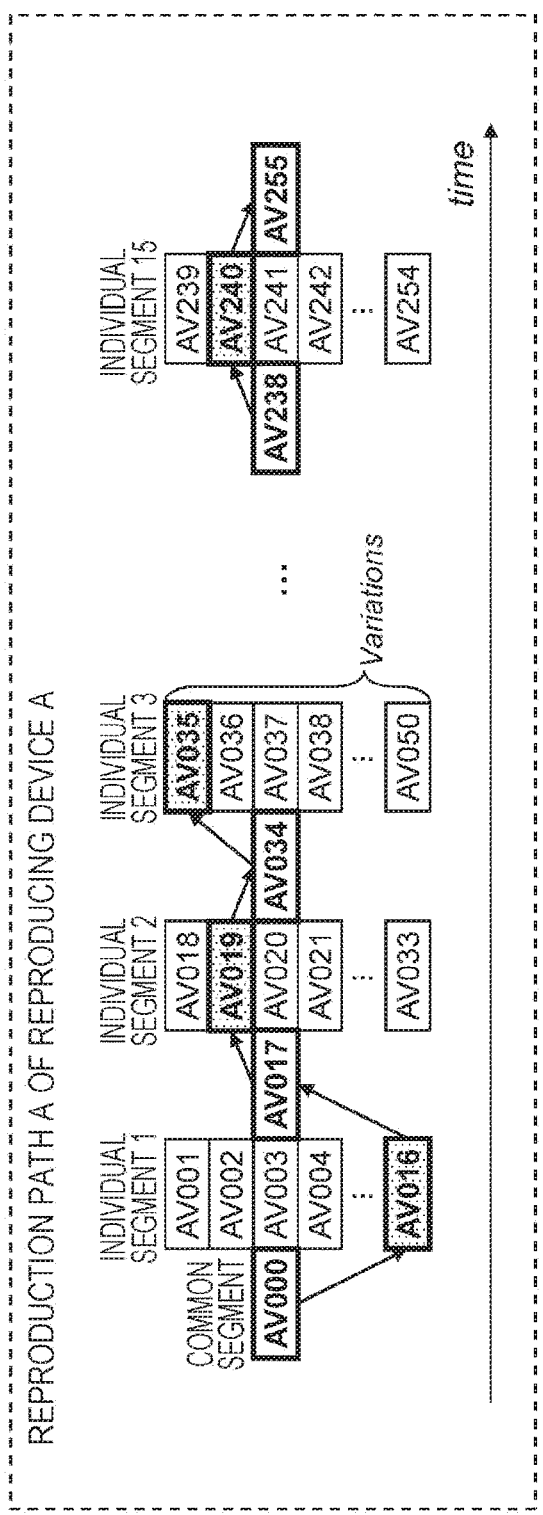
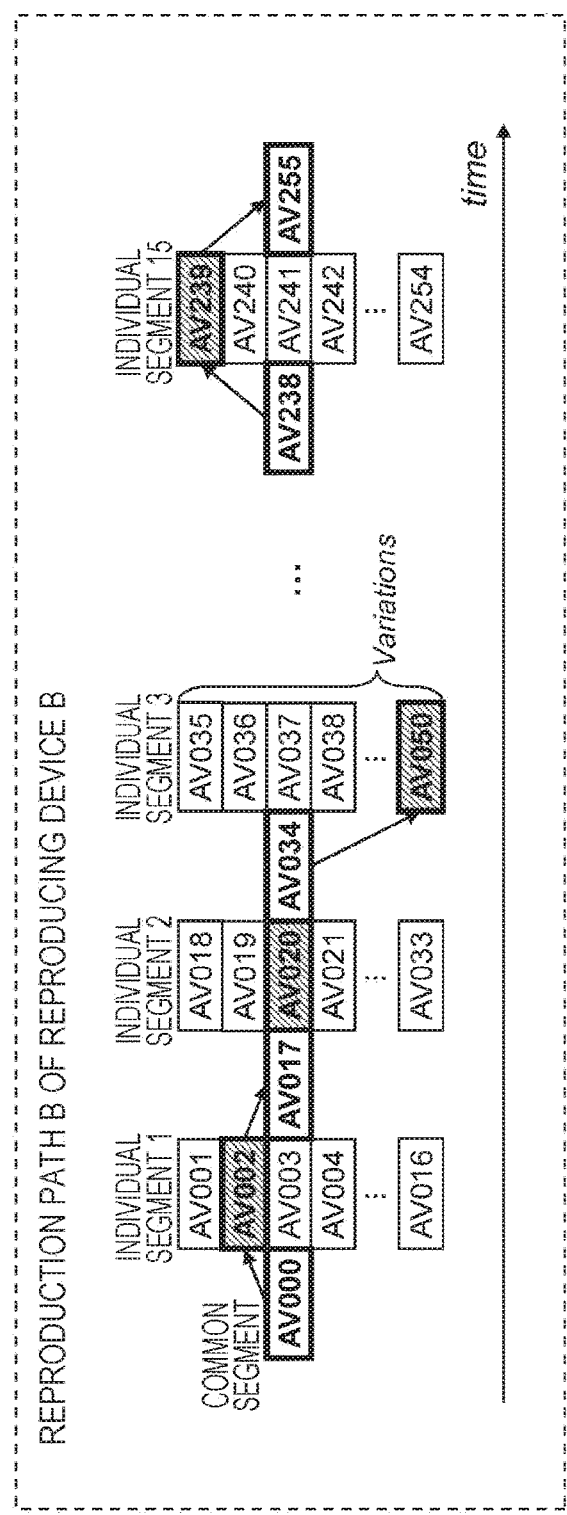
FIG. 1(A)
FIG. 1(B)

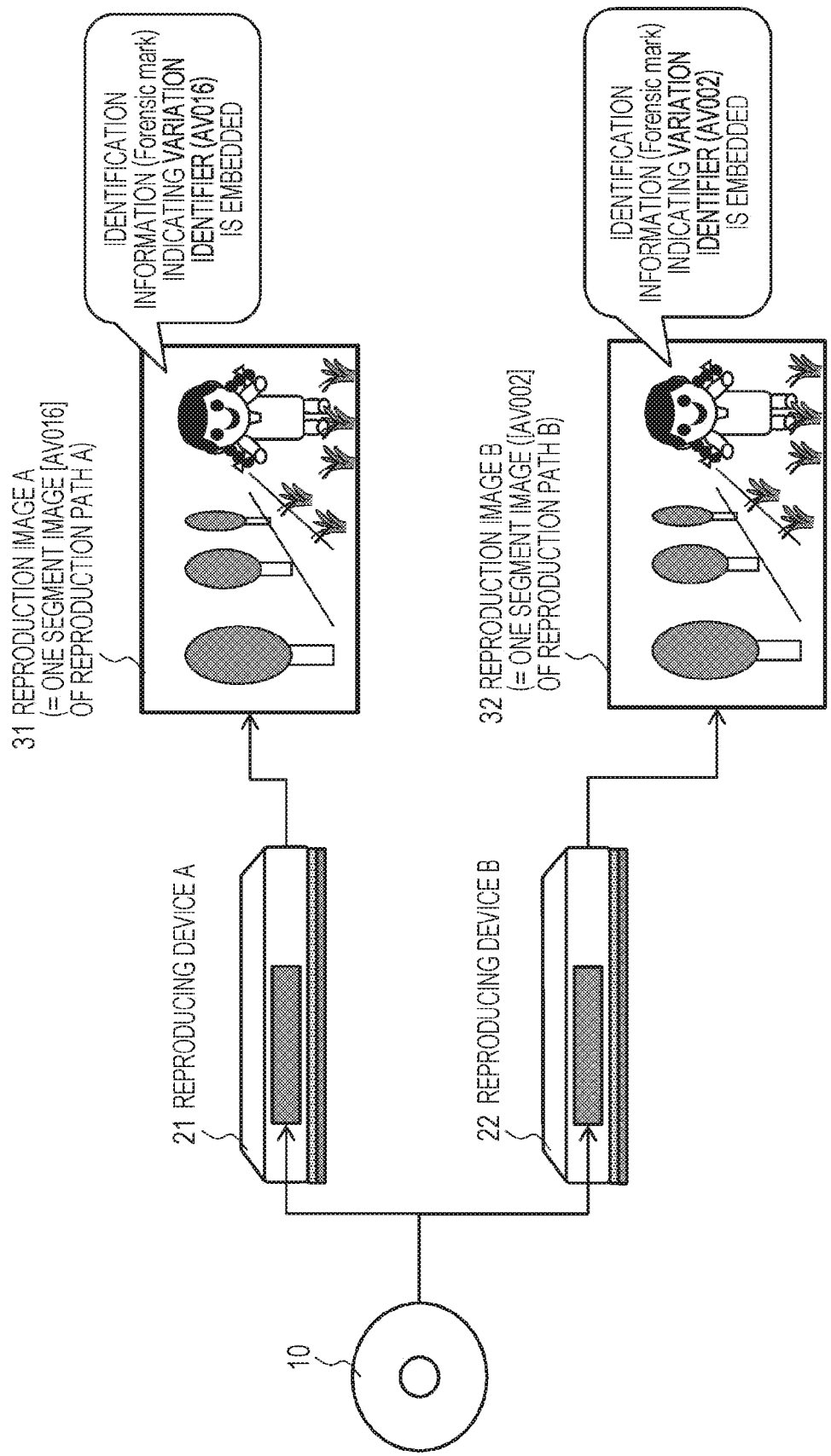

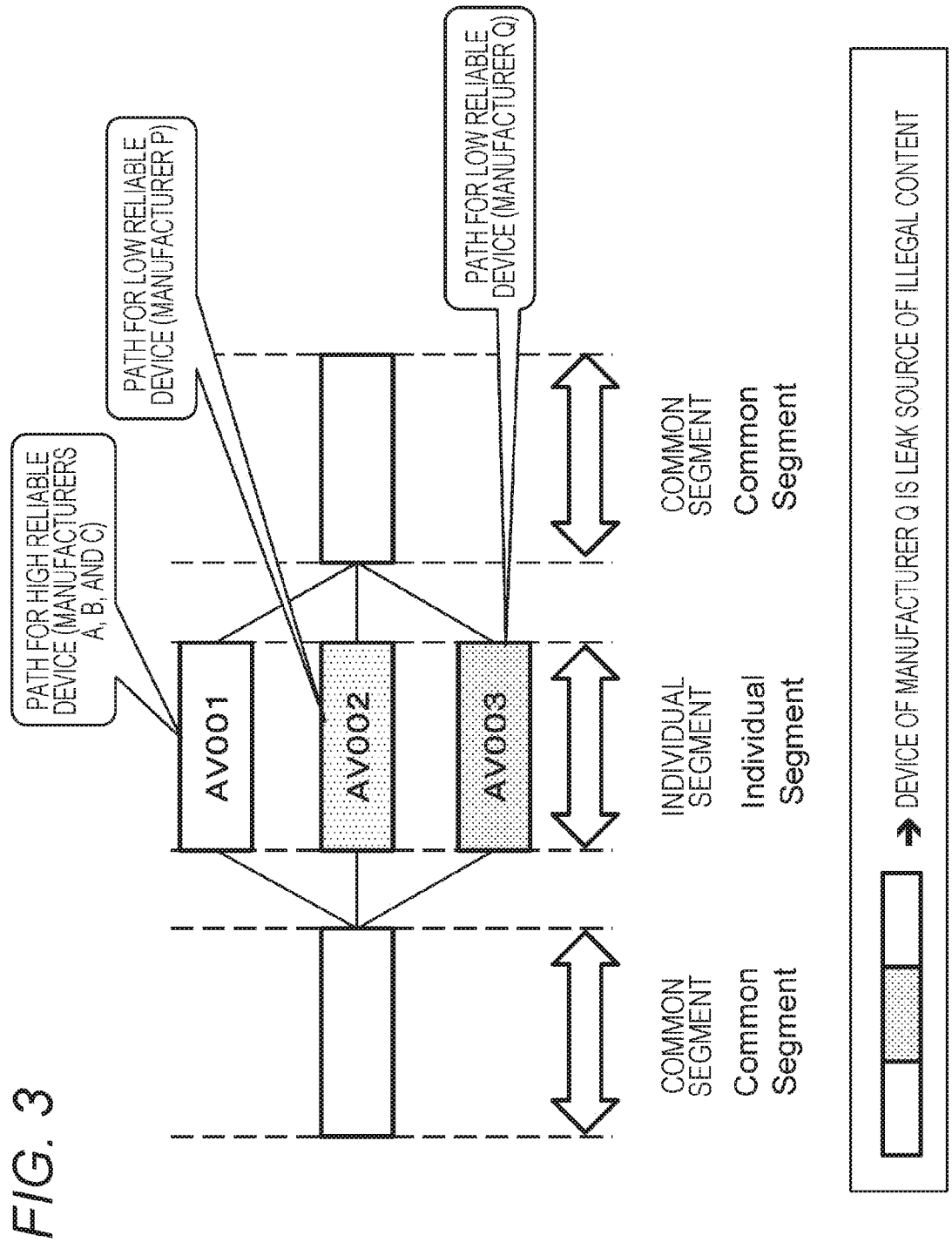

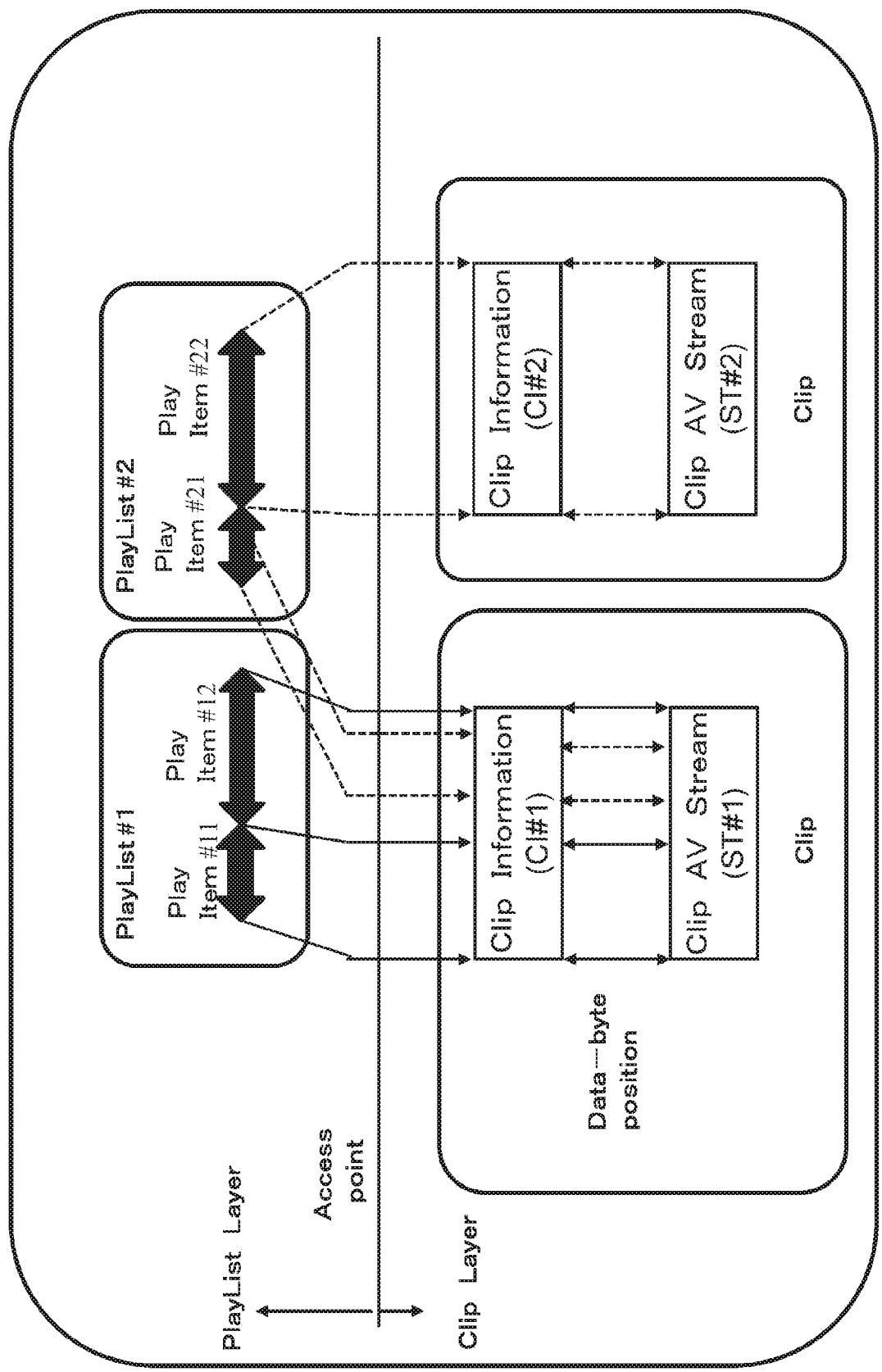

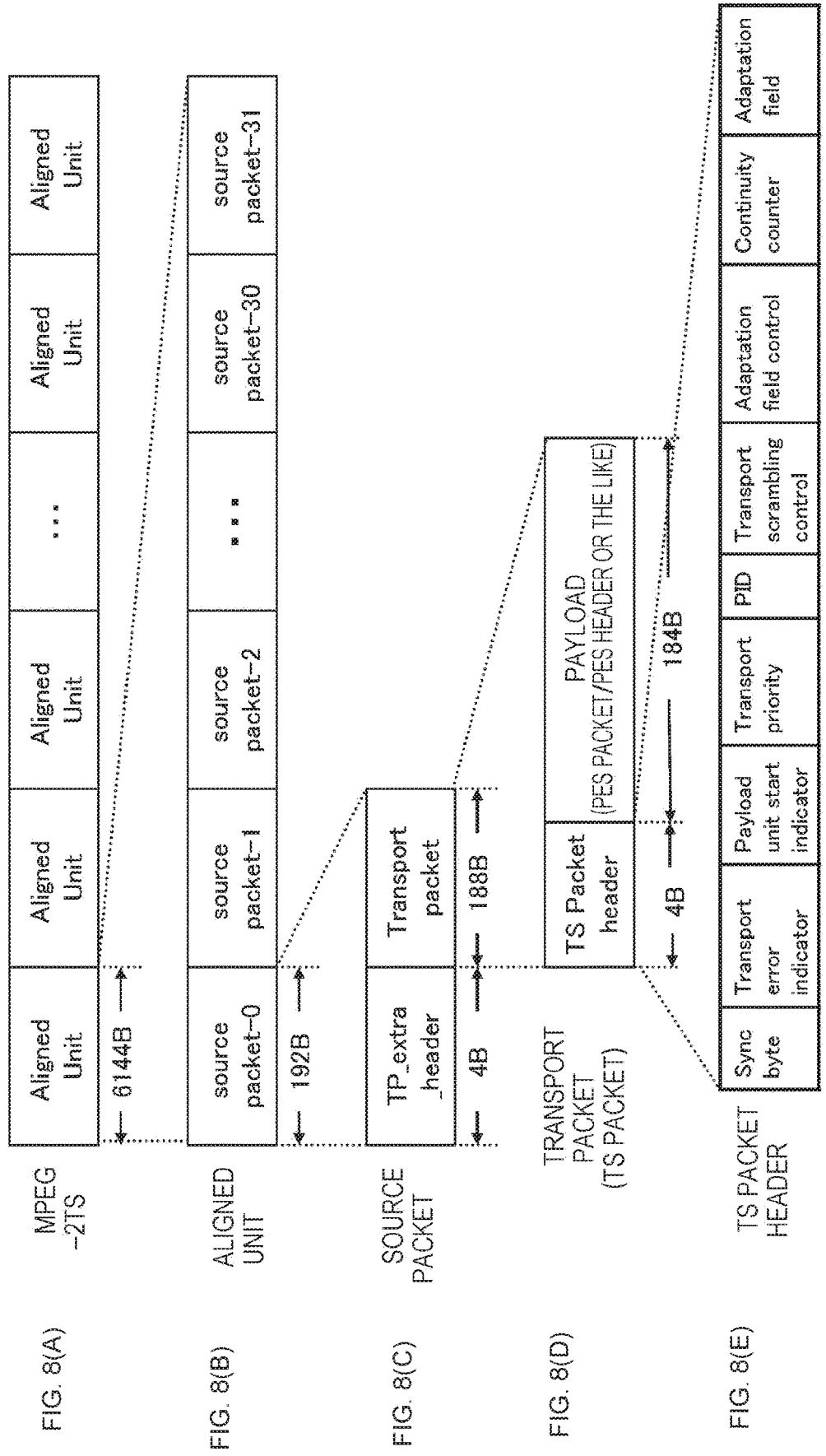

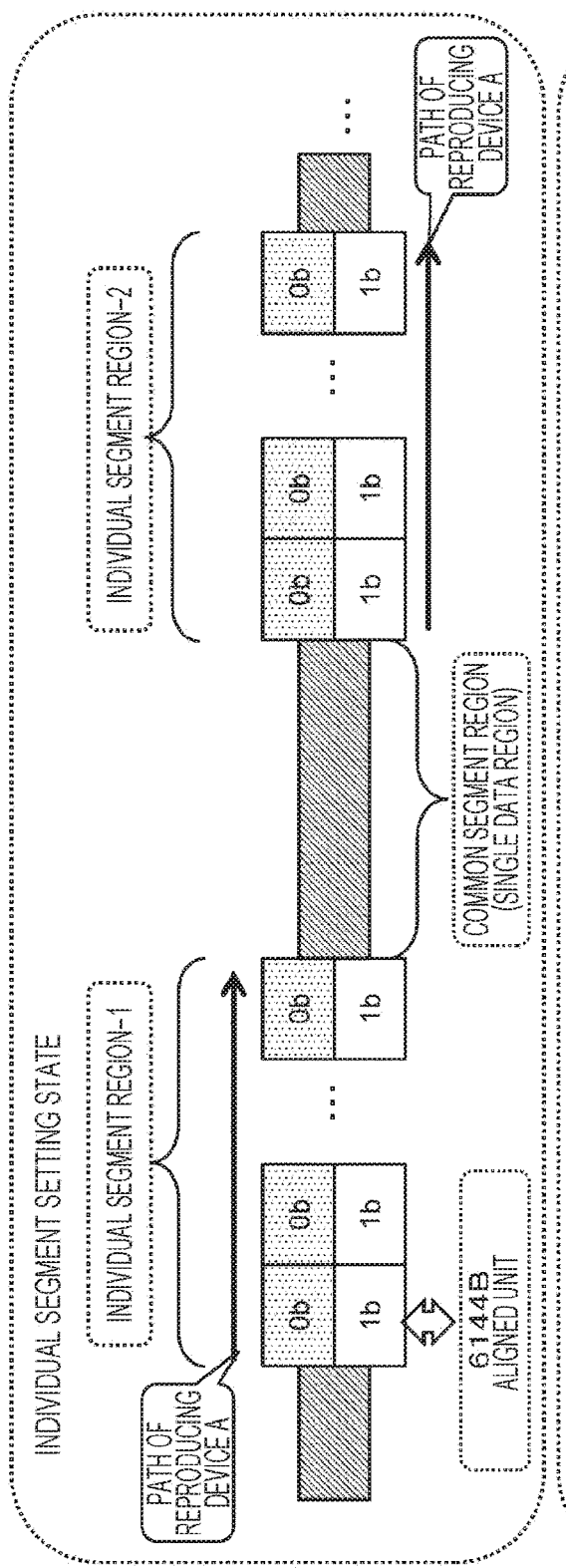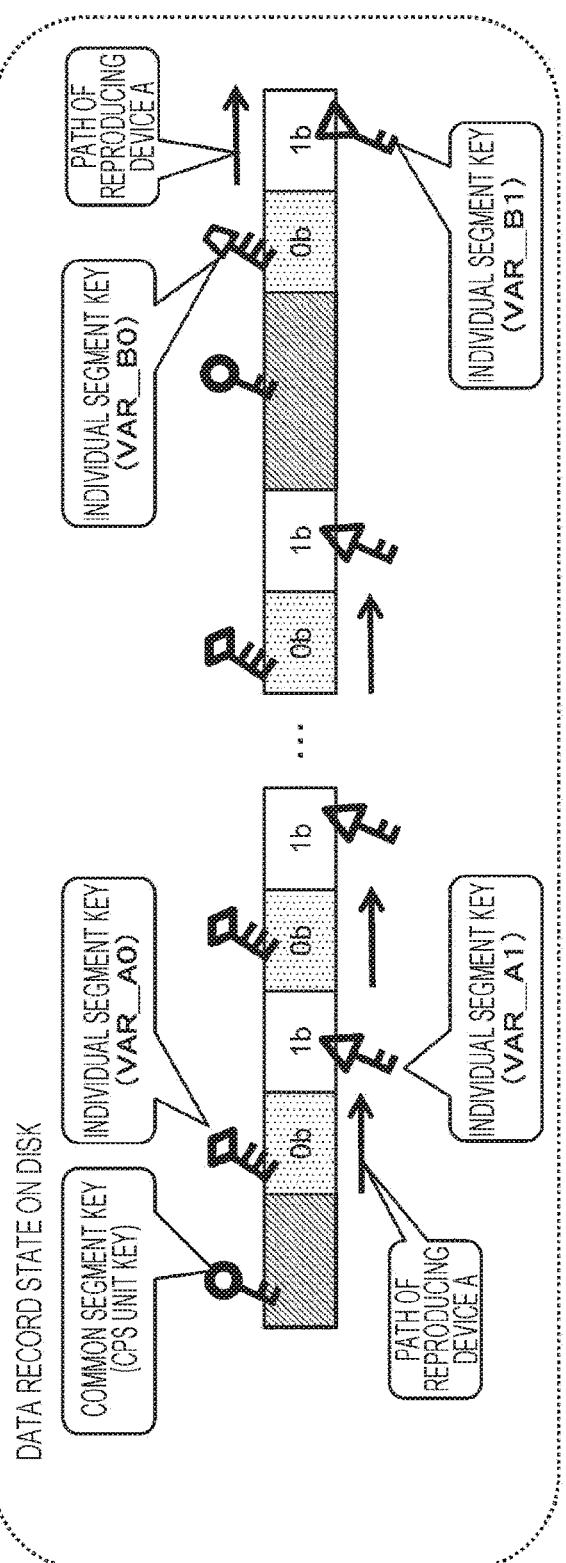
FIG. 9(A)
FIG. 9(B)

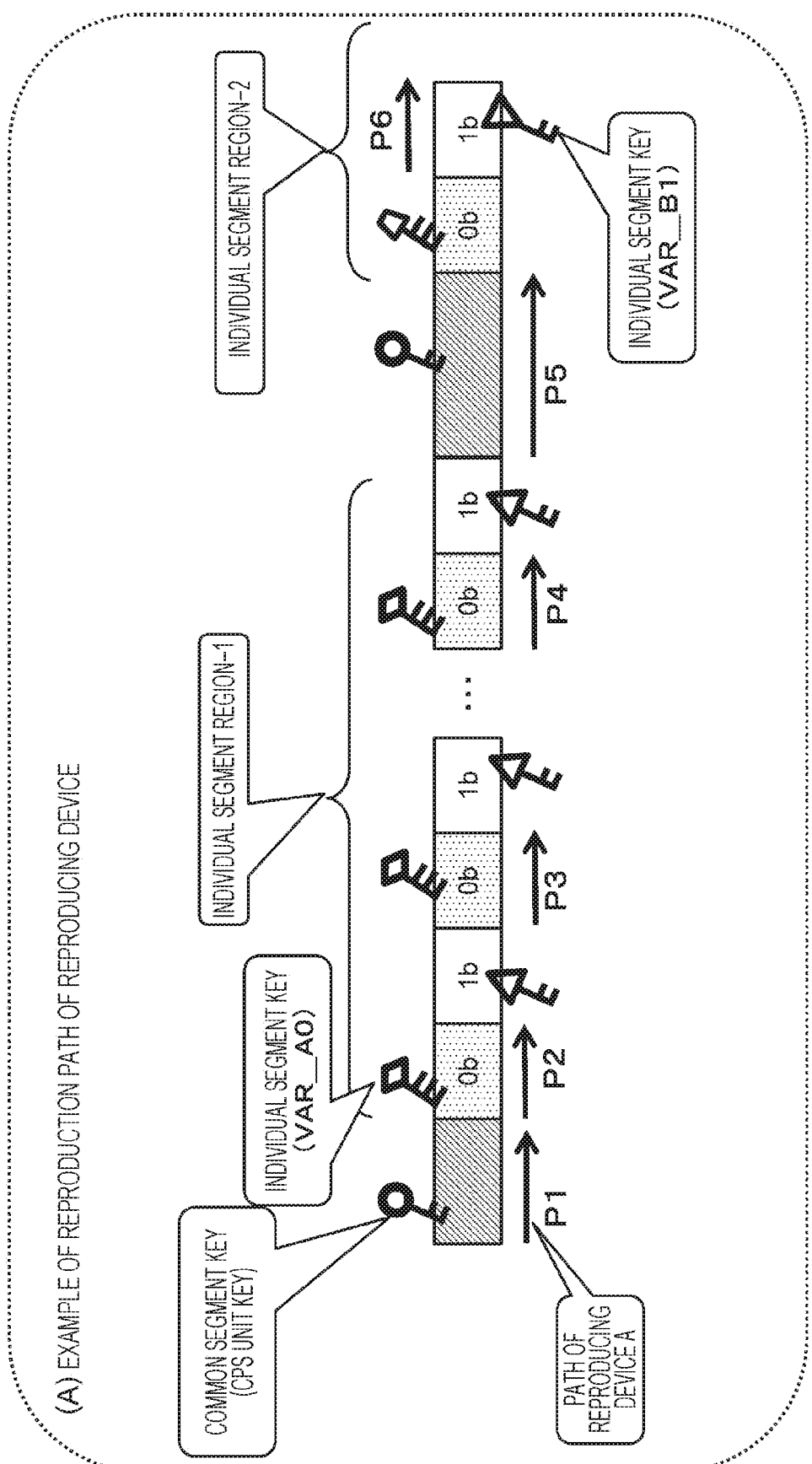

FIG. 13(A)

SETTING EXAMPLE OF COPY PERMISSION INFORMATION (CURRENT)

| | COPY PERMISSION INFORMATION (copy_permission_indicator) | MEANING |
|---|---|---|
| (1) | 00 | UNENCRYPTED DATA (unencrypted) |
| (2) | 01 | RESERVED |
| (3) | 10 | RESERVED |
| (4) | 11 | ENCRYPTED DATA (encrypted) |

FIG. 13(B)

SETTING EXAMPLE OF COPY PERMISSION INFORMATION (EXPANSION EXAMPLE)

| | COPY PERMISSION INFORMATION (copy_permission_indicator) | MEANING |
|---|---|---|
| (1) | 00 | UNENCRYPTED DATA (unencrypted) |
| (2) | 01 | ENCRYPTED DATA (encrypted) & [VARIATION DATA [1]] |
| (3) | 10 | ENCRYPTED DATA (encrypted) & [VARIATION DATA [2]] |
| (4) | 11 | ENCRYPTED DATA (encrypted) & [CPS UNIT KEY] |

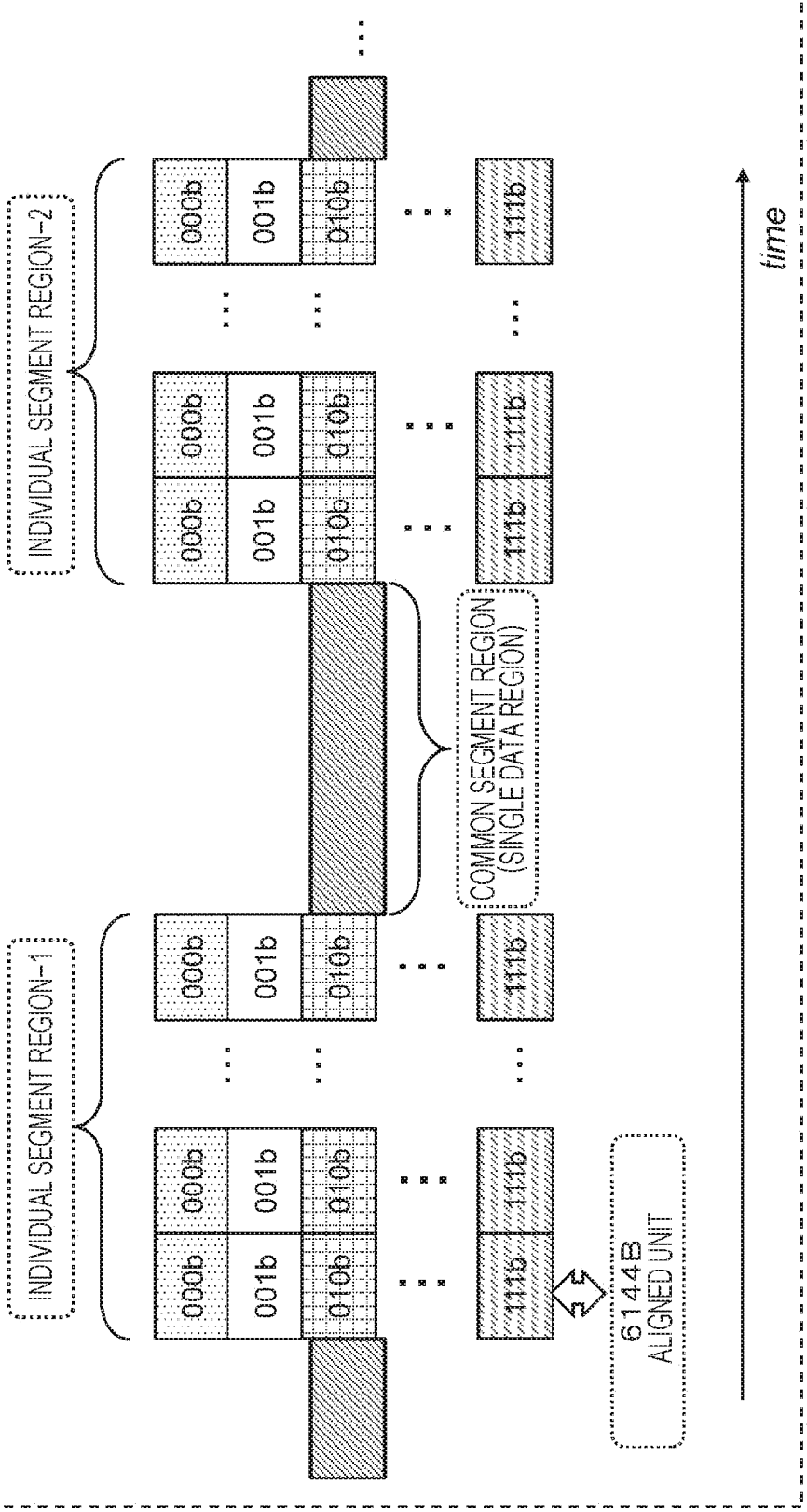

FIG. 17

(a) EXAMPLE OF SETTING VARIATION DATA IDENTIFIER IN ADAPTATION FIELD

| | VARIATION DATA IDENTIFIER (8bit) (Variant_id) | MEANING |
|---|---|---|
| (1) | 00000000 | VARIATION DATA [0] |
| (2) | 00000001 | VARIATION DATA [1] |
| (3) | 00000010 | VARIATION DATA [2] |
| (4) | 00000011 | VARIATION DATA [3] |
| : | : | : |
| (255) | 00000010 | VARIATION DATA [254] |
| (256) | 11111111 | VARIATION DATA [255] |

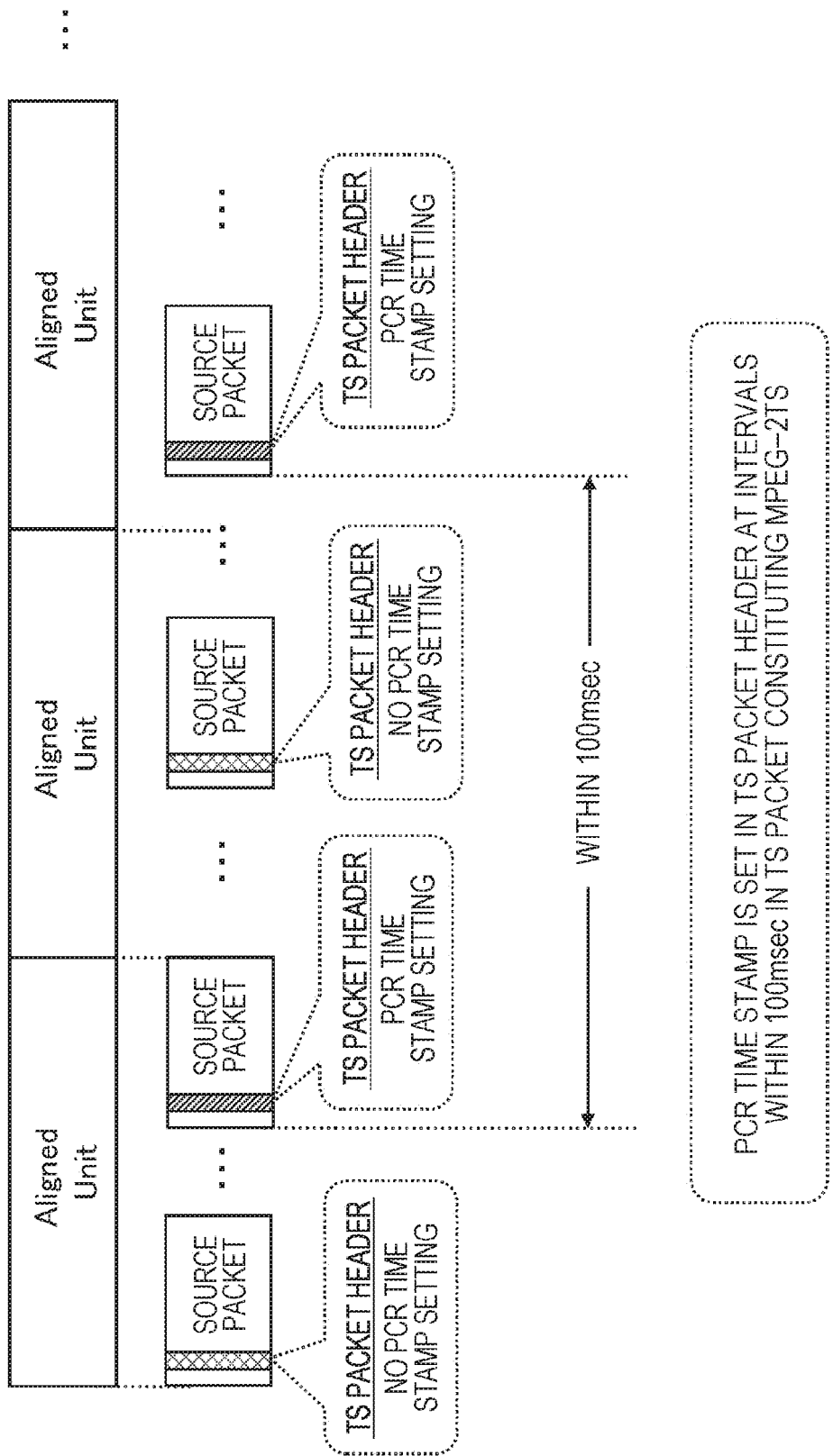

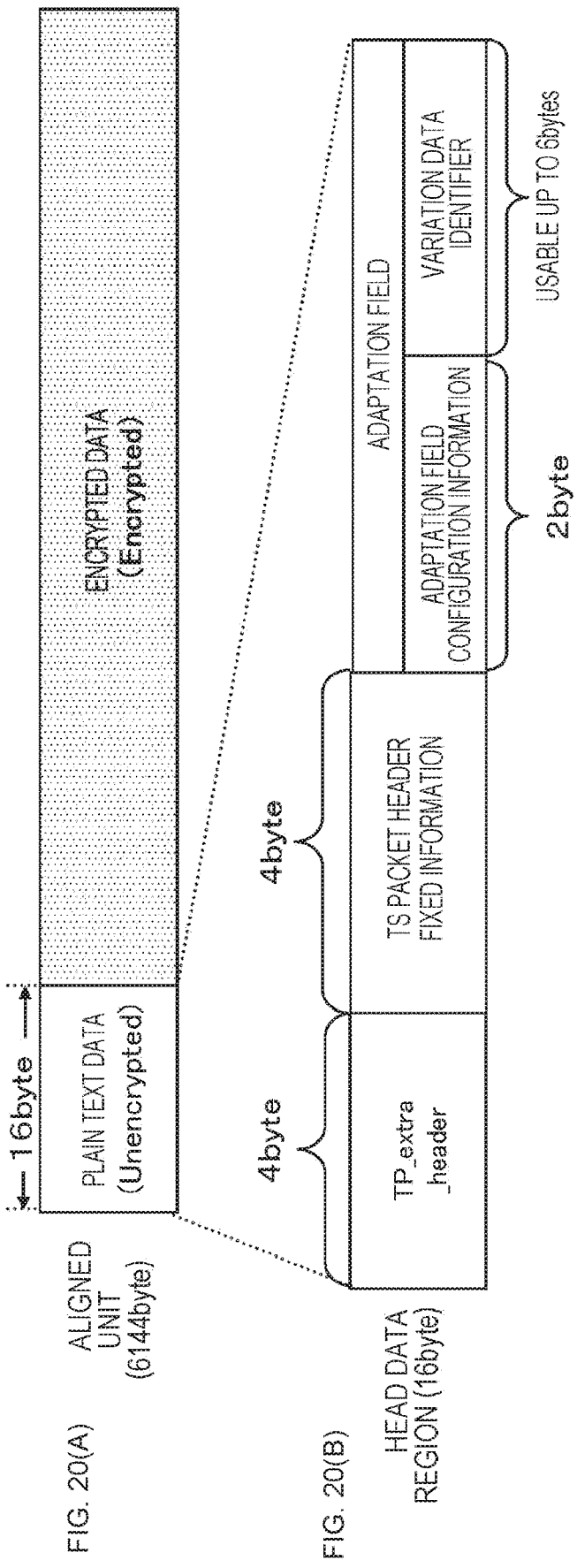

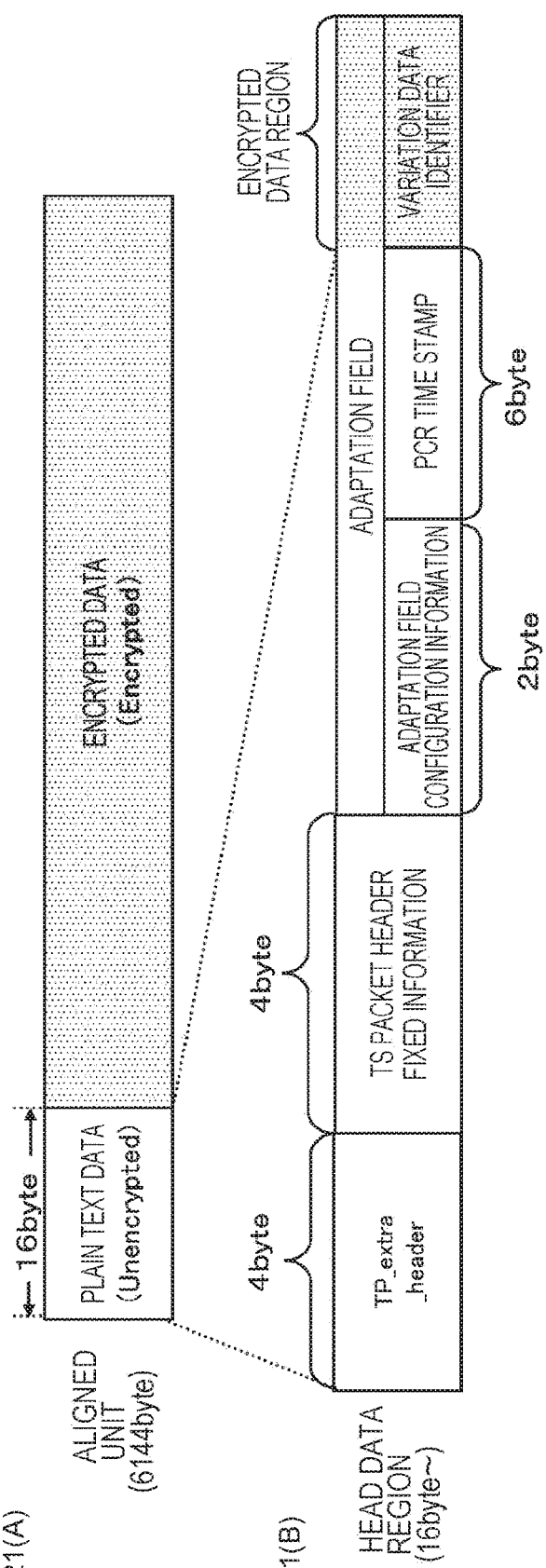

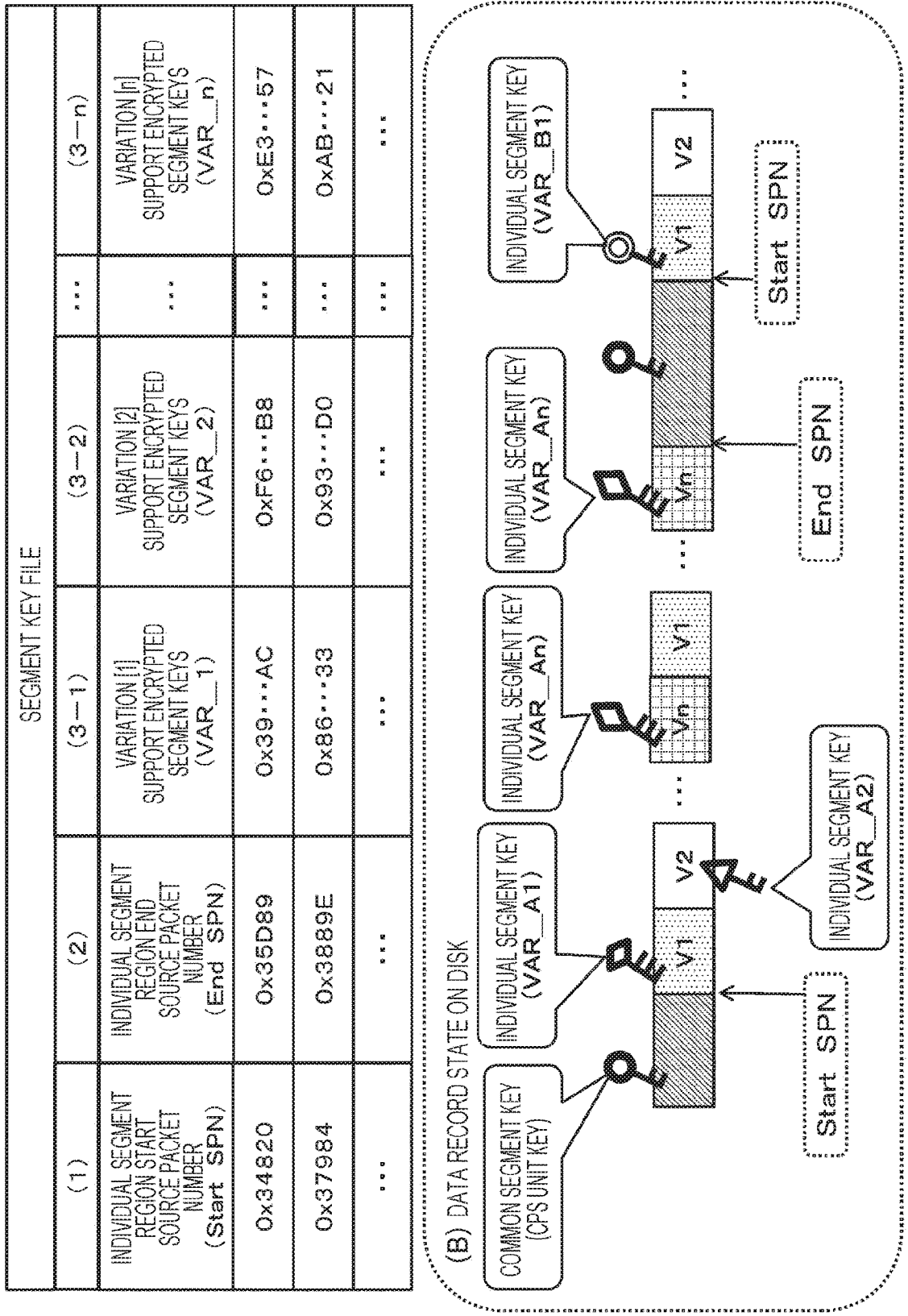

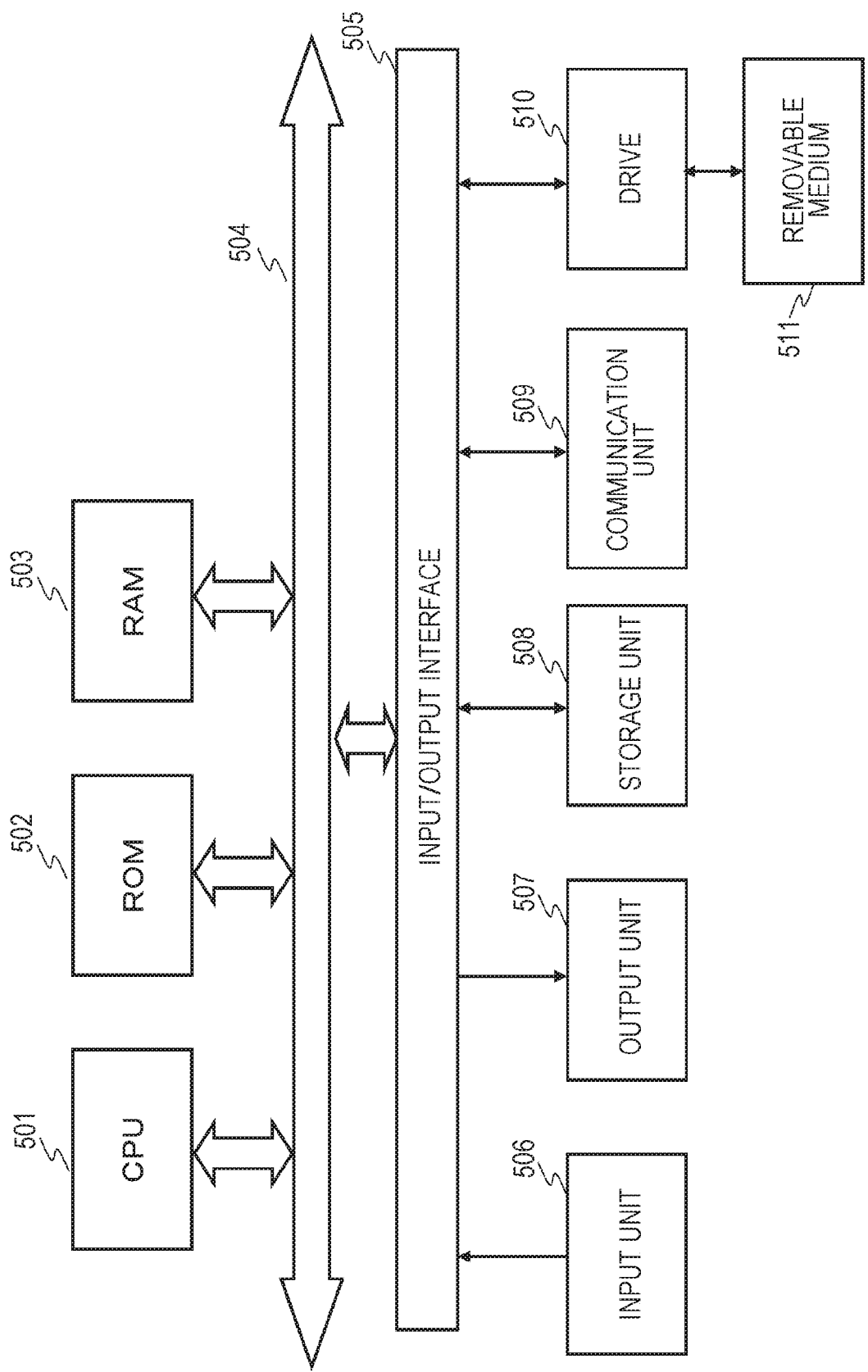

INFORMATION PROCESSING DEVICE, INFORMATION RECORDING MEDIUM, AND INFORMATION PROCESSING METHOD

CROSS REFERENCE TO RELATED APPLICATIONS

This application is a U.S. National Phase of International Patent Application No. PCT/JP2015/082033 filed on Nov. 13, 2015, which claims priority benefit of Japanese Patent Application No. JP 2014-251789 filed in the Japan Patent Office on Dec. 12, 2014. Each of the above-referenced applications is hereby incorporated herein by reference in its entirety.

TECHNICAL FIELD

The present disclosure relates to an information processing device, and an information processing method, and a program. More particularly, the present disclosure relates to an information processing device, an information recording medium, and an information processing method, and a program, which are capable of enabling source tracking of illegally distributed content.

BACKGROUND ART

Digital versatile discs (DVDs) and Blu-ray (registered trademark) discs (BDs) are widely used as information recording media for recording various content such as movies and music.

Copyrights, distribution rights, and the like are held by creators or distributors of many content such as music data, image data, and the like recorded in such information recording media. Therefore, when content is stored in such information recording media and provided to users, it is common to perform usage control such that only users having a legitimate right to use are permitted to use content.

Specifically, for example, control is performed such that content is recorded as encrypted content to be decryptable only by an encryption key provided to users who have performed a legitimate content purchase process. However, although such process is performed, for example, if the user who has obtained the encrypted content performs a process of illegally distributing or releasing the decrypted content or the encryption key, unspecified content is illegally used. Particularly in recent years, there are many cases in which illegal release or delivery of data via a network is performed, and it is a big problem how to prevent such illegality.

As a countermeasure for preventing circulation of illegal content, a configuration capable of identifying a device that has performed a decryption process on the basis of decrypted (plain text) content is known.

This is a configuration of analyzing decrypted content generated by decrypting encrypted content, for example, decrypted image data and identifying a device that has performed a decryption process on the basis of identification data extracted from an image.

A configuration of enabling such source tracking is disclosed in, for example, Patent Document 1 (Japanese Patent Application Laid-Open No. 2006-236121), Patent Document 2 (Japanese Patent Application Laid-Open No. 2007-43336), and the like.

In the configurations disclosed in Patent Documents mentioned above, segments constituting content, for example, images of a scene constituting movie content are set as a plurality of piece of variation data that can be decrypted by different keys. Each reproducing device selects, decrypts, and reproduces one piece of decryptable data from a plurality of pieces of variation data by applying a reproducing device-specific key stored in the reproducing device. The reproducing device in which different keys are stored decrypts and reproduces different variation data for the images of the same scene. As described above, different variation data is selected and reproduced by each reproducing device. In other words, a reproducing process according to a different reproduction path is performed in accordance with the reproducing device.

For example, when copy data of decrypted content is illegally distributed via a network, it is possible to identify a device that has generated the copy data which is illegally distributed, that is, a device that has decrypted the content in predetermined units by analyzing variation data included in the content or a reproduction path.

A range of identifiable devices depends on the number of set reproduction paths. The reproduction path differs in accordance with, for example, a set of encryption keys (decryption keys) (a device key set) stored in each reproducing device. The device key set can be set differently in various units such as device manufacturer units, device type units, individual device units, and the like.

When the device key set is different, it is possible to set different reproduction paths, and in the case of a configuration in which more reproduction paths can be set, it is possible to identify a source of illegal copy content in a narrower range. However, when setting a large number of variation data, the reproducing device needs to select one variation data from a large number of variation data in the content reproducing process.

The reproducing device selects, decrypts, and reproduces decryptable variation data using a key specific to its own device (device key), but when the number of variations increases, if a possibility of decrypting is inspected for all individual pieces of variation data, a processing time increases, and a reproduction delay is likely to occur.

CITATION LIST

Patent Document

Patent Document 1: Japanese Patent Application Laid-Open No. 2006-236121
Patent Document 2: Japanese Patent Application Laid-Open No. 2007-43336

SUMMARY OF THE INVENTION

Problems to be Solved by the Invention

The present disclosure was made in light of the above problems, and it is an object of the present disclosure to provide an information processing device, an information recording medium, and an information processing method, and a program, which are capable of enabling a reproducing device to select, decrypt, and reproduce data to be reproduced from a plurality of pieces of variation data reliably and promptly.

Solutions to Problems

A first aspect of the present disclosure lies in an information processing device, including:

a data processing unit that performs a reproducing process for content, wherein the content includes an individual segment region configured with a plurality of pieces of variation data that include different identification information embedded therein and are decryptable using different keys and a common segment region configured with single data, each piece of the variation data is configured with segmented data in units of aligned units, the data processing unit is configured to calculate a reproduction path by applying a device key held in a memory, sequentially select an aligned unit corresponding to one piece of variation data corresponding to the reproduction path from a plurality of aligned units constituting a plurality of pieces of variation data in the individual segment region, and reproduce the selected aligned unit, the data processing unit selects the aligned unit corresponding to the reproduction path on the basis of a variation data identifier recorded in an adaptation field in a TS packet header of a first source packet constituting the aligned unit.

Furthermore, a second aspect of the present disclosure lies in an information recording medium having content stored as record data therein, the content including an individual segment region configured with a plurality of pieces of variation data that include different identification information embedded therein and are decryptable using different keys and a common segment region configured with single data, a plurality of reproduction paths according to variation data to be selected being settable in the content, wherein each piece of the variation data is configured with segmented data in units of aligned units, and a variation data identifier is recorded in an adaptation field of a first source packet of each aligned unit as plain text data, and the information recording medium enables a reproducing device to select the aligned unit corresponding to the reproduction path on the basis of the variation data identifier recorded in the adaptation field in a TS packet header of the first source packet constituting the aligned unit and perform content reproduction.

Furthermore, a third aspect of the present disclosure lies in an information processing device, including:

a data processing unit that generates content in which an individual segment region including a plurality of pieces of variation data which include different identification information embedded therein and are decryptable using different keys and a common segment region including single data are provided, and a plurality of reproduction paths according to variation data to be selected is settable, wherein the data processing unit generates content in which each piece of variation data is configured with segmented data in units of aligned units, and a variation data identifier is recorded in an adaptation field of a first source packet of each aligned unit as plain text data.

Furthermore, a fourth aspect of the present disclosure lies in an information processing method performed in an information processing device, the information processing device including a data processing unit that performs a process of reproducing content, the content including an individual segment region configured with a plurality of pieces of variation data that include different identification information embedded therein and are decryptable using different keys and a common segment region configured with single data, each piece of the variation data being configured with segmented data in units of aligned units, the information processing method including:

calculating, by the data processing unit, a reproduction path by applying a device key held in a memory;

performing, by the data processing unit, a process of sequentially selecting an aligned unit corresponding to one piece of variation data corresponding to the reproduction path from a plurality of aligned units constituting a plurality of pieces of variation data in the individual segment region and reproducing the selected aligned unit; and selecting, by the data processing unit, the aligned unit corresponding to the reproduction path on the basis of a variation data identifier recorded in an adaptation field in a TS packet header of a first source packet constituting the aligned unit.

Furthermore, a fifth aspect of the present disclosure lies in an information processing method performed in an information processing device, the information processing device including a data processing unit that performs a content generation process, the information processing method including:

generating, by the data processing unit, content in which an individual segment region including a plurality of pieces of variation data which include different identification information embedded therein and are decryptable using different keys and a common segment region including single data are provided, and a plurality of reproduction paths according to variation data to be selected is settable; and generating, by the data processing unit, content in which each piece of variation data is configured with segmented data in units of aligned units, and a variation data identifier is recorded in an adaptation field of a first source packet of each aligned unit as plain text data.

Furthermore, a sixth aspect of the present disclosure lies in a program causing an information processing device to perform information processing, the information processing device including a data processing unit that performs a process of reproducing content, the content including an individual segment region configured with a plurality of pieces of variation data that include different identification information embedded therein and are decryptable using different keys and a common segment region configured with single data, each piece of the variation data being configured with segmented data in units of aligned units, the program causing the information processing device to perform:

a process of calculating, by the data processing unit, a reproduction path by applying a device key held in a memory;

a process of performing, by the data processing unit, a process of sequentially selecting an aligned unit corresponding to one piece of variation data corresponding to the reproduction path from a plurality of aligned units constituting a plurality of pieces of variation data in the individual segment region and reproducing the selected aligned unit; and a process of selecting, by the data processing unit, the aligned unit corresponding to the reproduction path on the basis of a variation data identifier recorded in an adaptation field in a TS packet header of a first source packet constituting the aligned unit.

Furthermore, a seventh aspect of the present disclosure lies in a program causing an information processing device to perform information processing, the information processing device including a data processing unit that performs a content generation process, the program causing the information processing device to perform:

generating, by the data processing unit, content in which an individual segment region including a plurality of pieces of variation data which include different identification information embedded therein and are decryptable using different keys and a common segment region including single data are provided, and a plurality of reproduction paths according to variation data to be selected is settable; and generating, by the data processing unit, content in which each piece of variation data is configured with segmented data in units of aligned units, and a variation data identifier is recorded in an adaptation field of a first source packet of each aligned unit as plain text data.

Further, a program according to the present disclosure is, for example, a program that can be provided to an information processing device or a computer system capable of executing various program codes through a computer readable storage medium or a communication medium. When such a program is provided in a computer readable format, processing according to the program is implemented on the information processing device or the computer system.

Other objects, features and advantages of the present disclosure will become apparent from detailed description based on embodiments of the present disclosure or the appended drawings which will be described later. Further, in this specification, a system refers to a logical aggregate configuration of a plurality of devices and not limited to a configuration in which devices of respective components are accommodated in the same housing.

Effects of the Invention

According to one embodiment of the present disclosure, a configuration capable of performing reliable source analysis on illegal copy content using content in which a reproduction path is settable is implemented.

Specifically, content in which an individual segment region including a plurality of pieces of variation data which include different identification information embedded therein and are decryptable using different keys and a common segment region including single data are provided, and variation data is configured with an aligned unit is set. A content reproducing device calculates a reproduction path by applying a device key and selects and reproduces an aligned unit corresponding to the reproduction path on the basis of a variation data identifier recorded in an adaptation field in a plaintext region at the head of a plurality of aligned units constituting the variation data.

Through this configuration, it is possible to implement a configuration capable of performing reliable source analysis on illegal copy content using content in which a reproduction path is settable.

Further, the effects described in this specification are merely examples and not limited, and additional effects may be obtained.

BRIEF DESCRIPTION OF DRAWINGS

FIGS. 1(A) and 1(B) are diagrams for describing an exemplary configuration of content including an individual segment region and a common segment region.

FIG. 2 is a diagram for describing an identification information detection example from configuration data of content including an individual segment region and a common segment region.

FIG. 3 is a diagram for describing a source determination process example for illegally distributed content based on identification information of an individual segment region.

FIG. 7 is a diagram for describing a correspondence between a playlist and reproduction data specified in a BDMV format.

FIGS. 8(A), 8(B), 8(C), 8(D) and 8(E) are diagrams for describing an exemplary configuration of an MPEG-2 transport stream (TS) as a data configuration of a clip AV stream file.

FIGS. 9(A) and 9(B) are diagrams for describing an exemplary configuration of content including an individual segment region and a common segment region and an example of data recording on a disk.

FIG. 10 is a diagram for describing a reproducing process example of a reproducing device.

FIGS. 13(A) and 13(B) are diagrams for describing an example of setting a variation data identifier.

FIG. 14 is a diagram for describing an exemplary configuration of content in which three or more pieces of variation data are set in an individual segment region.

FIG. 17 is a diagram for describing an example of recording a variation data identifier in an adaptation field.

FIG. 19 is a diagram for describing an arrangement example of a PCR time stamp.

FIGS. 20(A) and 20(B) are diagrams for describing a header configuration when a TS packet header including no PCR time stamp is recorded in a source packet at a head of an aligned unit.

FIGS. 21(A) and 21(B) are diagrams for describing a header configuration when a TS packet header including a PCR time stamp is recorded in a source packet at a head of an aligned unit.

FIG. 25 is a diagram for describing an example of a segment key file.

FIG. 26 is a diagram for describing an exemplary hardware configuration of an information processing device.

MODE FOR CARRYING OUT THE INVENTION

Figure 4:
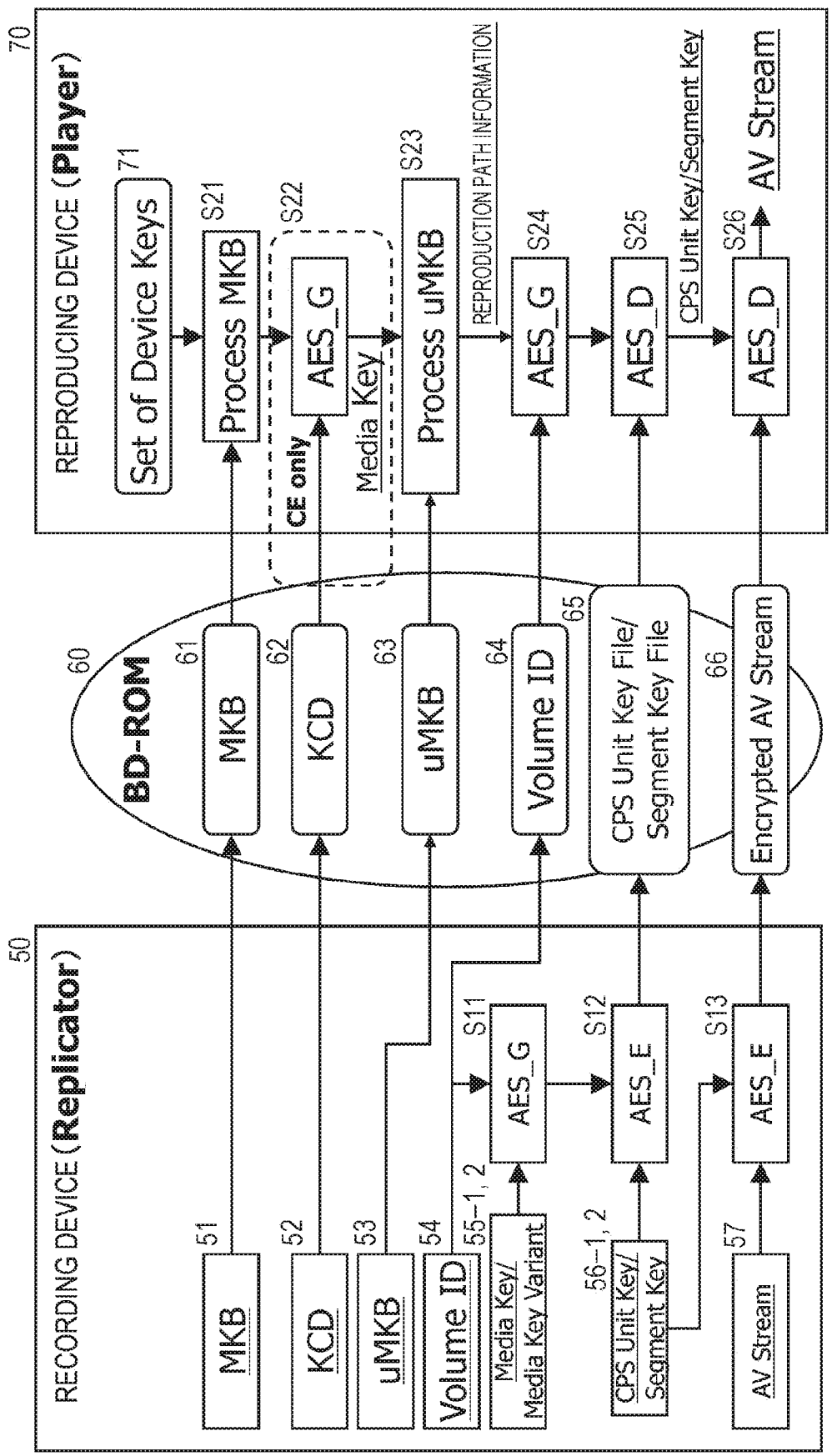
FIG. 4 is a diagram for describing a recording/reproducing process example for content including an individual segment region and a common segment region.

Hereinafter, an information processing device, an information recording medium, and an information processing method, and a program of the present disclosure will be described in detail with reference to the appended drawings.

Further, description will proceed in accordance with the following sections.

1. Overview of source tracking process based on reproduction path analysis
2. Content recording/reproducing process
3. Problem when individual segment region is reproduced
4. Example of setting individual segment region data (variation data) in units of aligned units
4-1. Exemplary configuration of disk record data
4-2. Example in which variation data is set in units of aligned units
5. Reproducing process according to reproduction path allocated to reproducing device
6. Selection process example of variation data in reproducing device
7. Example in which variation data identifier is set in adaptation field of TS packet header
8. Content reproduction sequence of reproducing device
9. Content editing, content generating device, and content recording device
10. Exemplary hardware configuration of information processing device
11. Conclusion of configuration of present disclosure

[1. Overview of Source Tracking Process Based on Reproduction Path Analysis]

First, an outline of a source tracking process based on a reproduction path analysis will be described.

A reproduction path setting example of content according to a reproducing device will be described with reference to FIGS. 1(A) and 1(B).

FIGS. 1(A) and 1(B) illustrate an exemplary configuration of reproduction data recorded on a disk including content such as movies stored therein and a data string selected when each reproducing device reproduces content, that is, a reproduction path.

FIGS. 1(A) and 1(B) illustrate the following two reproduction paths:

FIG. 1(A) a reproduction path A of a reproducing device A; and

FIG. 1(B) a reproduction path B of a reproducing device B.

Each of AV00 to AV255 illustrated in FIGS. 1(A) and 1(B) is image data configured with reproduction data of content such as movies, and more specifically, image data configured with image frames of about several seconds. The reproduction data is arranged from the left to the right, and the reproducing device starts reproduction from AV000 and performs reproduction up to AV255.

Here, a plurality of pieces of image data of the same scenes is set in an individual segment region (individual segments 1 to 15). For example, 16 pieces of image data of AV001 to AV016 are set in the individual segment 1.

The 16 pieces of image data of AV001 to AV0016 are the image data of the same scene but encrypted using different keys (segment keys).

The data which is encrypted using different encryption keys and set in this individual segment region is referred to as "variation data."

Each reproducing device can acquire a segment key from a segment key file stored in a disk together with content using a key or the like stored in its own device (a device key).

Here, the segment key that can be acquired using the device key stored in one reproducing device is only one segment key for each individual segment region.

In other words, each reproducing device can acquire the segment key capable of decrypting one piece of variation data among a plurality of pieces of variation data (for example, AV001 to AV016) of each individual segment region (for example, the individual segment 1).

A combination of segment keys that can be obtained from the segment key file differs in accordance with the device key stored in the reproducing device.

The reproducing device selects one piece of decryptable variation data from one individual segment region using the segment key obtained from the segment key file, and decrypts and reproduces the selected variation data.

An interval in which only one piece of data is set other than the individual segment region is referred to as a "single data region" or a "common segment region." For example, only one piece of data is set in a reproduction interval of AV000, AV017, and the like, and all reproducing devices reproduce only one piece of data.

Further, data in the single data regions is also encrypted data.

The data can be decrypted by applying a CPS unit key (also referred to as a "title key") acquirable from a CPS unit key file stored in a disk including content stored therein.

The reproducing device acquires the CPS unit key from the CPS unit key file through a process of applying the device key stored in the reproducing device or data stored in the disk.

Figure 15:
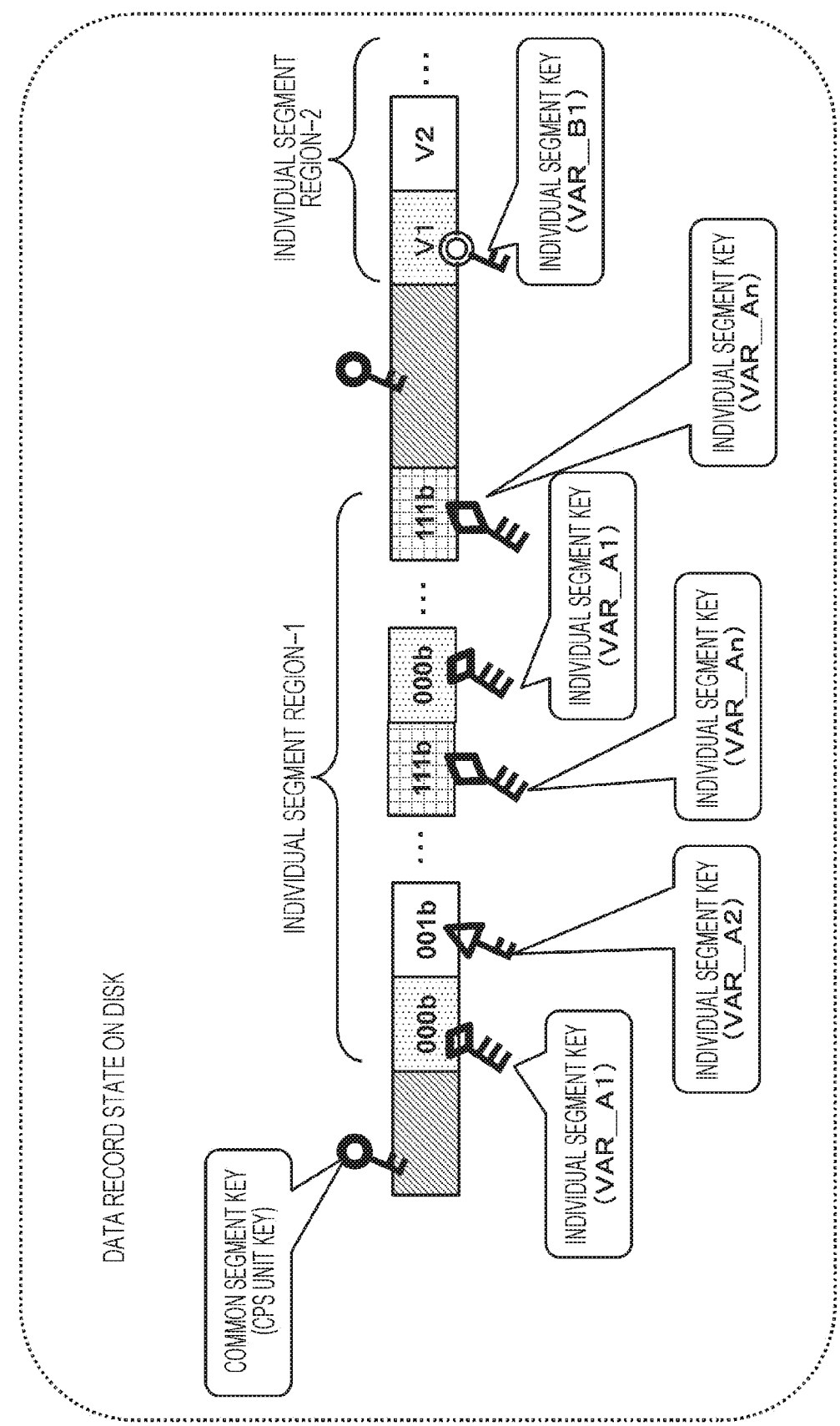
FIG. 15 is a diagram for describing an example of data recording on a disk for content in which three or more pieces of variation data are set in an individual segment region.
Figure 16:
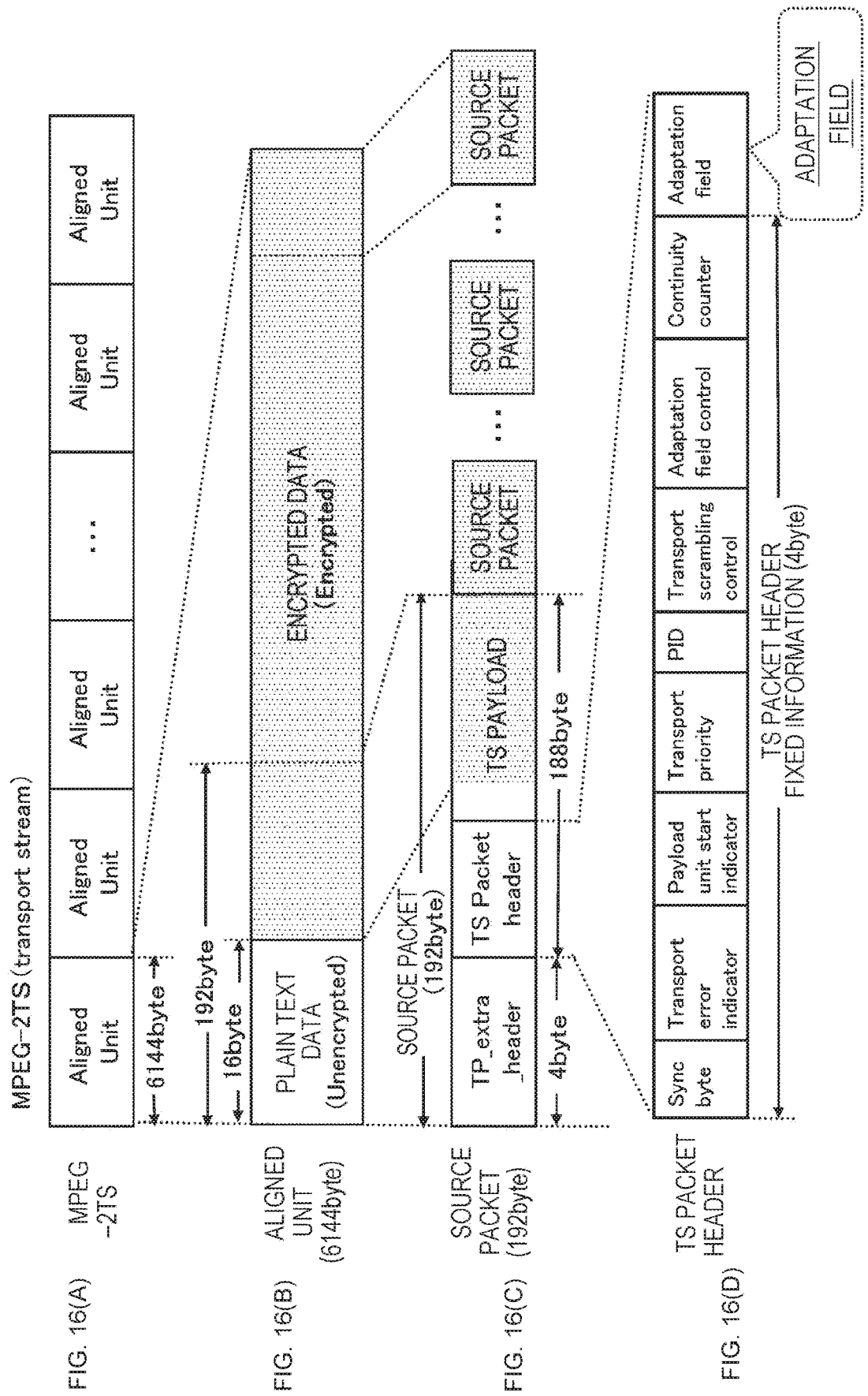
FIGS. 16(A), 16(B), 16(C), and 16(D) are diagrams for describing an adaptation field set in a TS packet header.

In the example illustrated in FIGS. 1(A) and 1(B), 15 individual segment regions (individual segments 1 to 15) are set in content.

Further, data encrypted using 16 different keys (segment keys) (variation data=data decryptable using different keys) is set in each of the individual segments 1 to 15. Each piece of data that is set in the individual segment region and can be decrypted using different keys is called variation data.

A key for decrypting the variation data is the segment key. For example, the segment key can be acquired from the segment key file stored in the disk together with a reproduction target content.

Here, the segment keys stored in the segment key file are individually encrypted, and the reproducing device can acquire some segment keys through the decryption process using the device key or the like stored in the reproducing device.

The segment key that can be acquired by one reproducing device is a key capable of decrypting only one of a plurality of pieces of variation data set in each individual segment region.

For each individual segment region, the reproducing device sequentially acquires the segment key that can be acquired from the segment key file, decrypts one piece of variation data using the acquired segment key, and performs a reproducing process.

As described above, each reproducing device selects one piece of decryptable variation data from one individual segment region and performs the reproducing process.

The reproducing device including the different device keys stored therein performs the reproducing process in accordance with the different reproduction paths.

The reproduction paths of the reproducing device A are illustrated in the example illustrated in FIG. 1(A).

The reproducing device A sequentially reproduces each piece of the following data.

AV000→[AV016]→AV017→[AV019]→AV034→[AV035]→AV238→[AV240]→AV255

This is the reproduction path A of the reproducing device A.

Further, as indicated by [AVxxx] in the reproduction data, data surrounded by [ ] is the variation data set in each individual segment region.

The reproducing device A acquires the segment key by decrypting an encrypted segment key stored in the segment key file from the 16 pieces of variation data (encrypted data) set in the individual segment region using the key (device key) of the reproducing device A.

The reproducing device A selects and reproduces the decryptable variation data by applying the acquired segment key.

Data which is not surrounded by [ ] is data which is not associated with the individual segment region and reproduced in all the reproducing devices in common.

On the other hand, the reproducing device B illustrated in FIG. 1(6) sequentially reproduces the following data.

AV000→[AV002]→AV017→[AV020]→AV034→[AV050]→AV238→[AV239]→AV255

This is the reproduction path B of the reproducing device B.

As indicated by [AVxxx] in the reproduction data, data indicated by [ ] is the variation data.

The reproducing device B acquires some segment keys from the segment key file using the device key stored in the reproducing device B.

Further, the reproducing device B selects one piece of decryptable variation data from the 16 pieces of variation data (encrypted data) set in the individual segment region by applying the acquired segment key and reproduces the selected variation data.

Data which is not surrounded by [ ] is data which is not associated with the individual segment region and reproduced in all the reproducing devices in common.

When the reproduction path A of the reproducing device A is compared with the reproduction path B of the reproducing device B, the reproduction data in the single data region other than the individual segment region is common. However, the variation data reproduced in the individual segment region is different data.

This is because the device key stored in the reproducing device A is different from the device key stored in the reproducing device B, and combinations of segment keys that can be acquired from the segment key file are different.

An identifier indicating the variation data, for example, a data identifier such as [AVxxx] is embedded in the variation data set in the individual segment region in each reproduction path. For example, an identifier is embedded by a technique such as a digital watermark (WM).

In other words, it is possible to determine the variation data that has been reproduced by analyzing the reproduction image data.

The reproduction image data and an image analysis process for the reproduction image data by each reproducing device will be described with reference to FIG. 2.

Content configured with the individual segment region and the single data region described with reference to FIGS. 1(A) and 1(B) is stored in an information recording medium (disk) 10 illustrated in FIG. 2.

A reproducing device A,21 performs content reproduction in accordance with the reproduction path A described with reference to FIG. 1(A).

A reproducing device B,22 performs content reproduction in accordance with the reproduction path B described with reference to FIG. 1(B).

A reproduction image A,31 is variation data selected from one individual segment region, that is, the variation data [AV016] included in the reproduction path A.

A reproduction image B,32 is different variation data selected from the same individual segment region, that is, the variation data [AV002] included in the reproduction path B.

Both of the two reproduction images A and B are, for example, images of the same scene of movie content, and are images that are viewable to viewers without distinction.

However, the reproduction image A,31 is the variation data [AV016] included in the reproduction path A, and identification information (data identifier) indicating the variation data [AV016] is embedded in the reproduction image A,31. For example, it is possible to analyze the identifier through a digital watermark analysis process.

Further, as described above, the identification information embedded in the reproduction data is referred to as a "forensic mark" or a "forensic watermark."

One reproduction image B,32 is the variation data [AV002] included in the reproduction path B, and the identification information (data identifier) indicating the variation data [AV002] is embedded in this reproduction image B,32.

15 individual segment regions (individual segments 1 to 15) are set in the content illustrated in FIGS. 1(A) and 1(B).

For example, when illegally distributed copy content is found from a network, the reproduction path of the content becomes clear by identifying the variation data corresponding to the reproduction image in the 15 individual segment regions included in the illegally distributed content.

For example, when the illegally distributed copy content is content configured with the reproduction path A illustrated in FIGS. 1(A) and 1(B), it can be determined that the content decrypted by the reproducing device A illustrated in FIG. 2 is the original content, and the reproducing device A is the source of the illegal copy content.

Further, for example, when the illegally distributed copy content is content configured with the reproduction path B illustrated in FIGS. 1(A) and 1(B), it can be determined that the content decrypted by the reproducing device B illustrated in FIG. 2 is the original content, and the reproducing device B is the source of the illegal copy content.

A specific source tracking process example based on data of the individual segment region will be described with reference to FIG. 3.

FIG. 3 illustrates three consecutive segment regions, that is, the common segment region, the individual segment region, and the common segment region as a part of content configuration data.

For example, one piece of variation data [AV001] in the individual segment region is assumed to be data that can be decrypted using the segment key held in reproducing devices of a plurality of manufacturers A, B and C with high reliability.

Further, one piece of variation data [AV002] in the individual segment region is assumed to be data that can be decrypted by the segment key held in a reproducing device of one specific manufacturer P with low reliability.

Further, one piece of variation data [AV003] in the individual segment region is assumed to be data that can be decrypted by the segment key held in a reproducing device of another specific manufacturer Q with low reliability.

In the case of this setting, when one piece of variation data [AV002] in the individual segment region is detected from the illegally distributed content, it can be determined that the source of the illegally distributed content is the reproducing device of the specific manufacturer P.

Similarly, when one piece of variation data [AV003] in the individual segment region is detected from the illegally distributed content, it can be determined that the source of the illegally distributed content is the reproducing device of the specific manufacturer Q.

[2. Content Recording/Reproducing Process]

Next, sequences of a process of recording the content having the above-described setting and a content reproducing process will be described with reference to FIG. 4.

In FIG. 4, a recording device (replicator) 50, an information recording medium (disk (BD-ROM)) 60 including content recorded therein, and a reproducing device (player) 70 are illustrated from the left.

First, the content recording process performed by the recording device (replicator) 50 will be described.

The recording device 50 records each piece of the following data in the information recording medium 60:
 a media key block (MKB) 51;
 key conversion data (KCD) 52;
 an unified-media key block (uMKB) 53; and
 a volume ID 54.

The MKB 51, the KCD 52, and the uMKB 53 are configured with data such as a key used for acquiring reproduction path information specific to the reproducing device 70 through a process of applying a device key set (Set of Device Keys) 71 held in the reproducing device.

The volume ID 54 is, for example, an identifier which is set in association with content corresponding to a specific title, and is data applied to a calculation of the segment key or the CPS unit key in the reproducing device 70.

In step S11, the recording device 50 first generates an encryption key of the CPS unit key file storing the CPS unit key applied to decryption of the common segment region and an encryption key applied to decryption of the segment key file storing the segment key applied to decryption of the individual segment region.

Further, AES_G, AES_E, and AES_D illustrated in FIG. 4 indicate a data (random number or the like) generation process, an encryption process, and a decryption process in accordance with an AES encryption algorithm.

The encryption key of the CPS unit key file is generated using the volume ID 54 and a media key 55-1.

The encryption key of the segment key file is generated using the volume ID 54 and a media key variant 55-2.

Further, in the segment key file storing the segment key, keys corresponding to all pieces of variation data set in each individual segment region are stored as encrypted data. The media key variant 55-2 is different data corresponding to each piece of variation data, and different encryption keys to be applied to the respective segment keys are generated using this data.

In step S12, the recording device 50 encrypts a CPS unit key file 56-1 and a segment key file 56-2 and records the CPS unit key file 56-1 and the segment key file 56-2 in the information recording medium 60.

Further, in step S13, encrypted content (encrypted AV stream) is generated by performing a process of encrypting the common segment region and the individual segment region by applying the CPS unit key acquired from the CPS unit key file 56-1 and the segment key acquired from the segment key file 56-2 to an AV stream 57 configured with, for example, content such as a movie and recorded in the information recording medium 60.

The following data is recorded in the information recording medium 60.
 an MKB 61;
 a KCD 62;
 a uMKB 63;
 a volume ID 64;
 a CPS unit key file & segment key file 65; and
 an encrypted content (Encrypted AV stream) 66.

Next, the process of the reproducing device (player) 70 will be described.

The reproducing device 70 stores a device key set (Set of Device Keys) 71 specific to the reproducing device in a memory.

The device key set (Set of Device Keys) 71 can perform various settings such a setting differing according to a type of device, a manufacturer, or the like and a setting differing according to each device.

In steps S21 to S23, the reproducing device 70 performs a process using the following data and acquires the reproduction path information:
 the device key set (Set of Device Keys) 71; and
 the following data recorded in the information recording medium 60, that is,
 the MKB 61;
 the KCD 62; and
 the uMKB 63.

This reproduction path information has a path differing according to the device key set (Set of Device Keys) 71 held in the reproducing device.

The reproduction path information generated in step S23 is information indicating the variation data to be selectively reproduced in each individual segment region. For example, the reproduction path information is information indicating the variation data serving a selective reproduction target in each individual segment region and configured with data or the like in which the identifier of the variation data serving as the selective reproduction target in the individual segment region is set as follows:
 individual segment 1: variation data identifier AV002;
 individual segment 2: variation data identifier AV001;
 individual segment 3: variation data identifier AV003; and
 individual segment 4: variation data identifier AV002.

Then, in steps S24 to S25, the reproducing device 70 calculates the key necessary for decrypting data in the segment region added to the reproduction path information.

In other words, the CPS unit key applied to decryption of the common segment region configuration data and the segment key applied to decryption of one piece of variation data in the individual segment region are calculated.

The following data acquired from a disk 60 is used for the key calculation:
 the volume ID 64; and
 the CPS unit key file & segment key file 65.

Further, the segment keys applied to decryption of all pieces of variation data included in the individual segment region are encrypted using individual encryption keys and stored in the segment key file 65. The segment key that can be acquired (decrypted) by one reproducing device 70 is only one segment key per individual segment region. In other words, only one segment key applicable to decryption of one piece of variation data selected in accordance with the reproduction path information can be acquired (decrypted).

This changes in accordance with the device key set 71 stored in the reproducing device 70.

Then, in step S26, the reproducing device 70 reads encrypted content 66 from the disk, performs the decryption process using the CPS unit key and the segment key, generates decrypted content (AV stream), and performs the reproducing process.

As described above, the reproducing device 70 reproduces content in accordance with the reproduction path specific to the reproducing device.

[3. Problem when Individual Segment Region is Reproduced]

When the content in which the common segment region and the individual segment region described with reference to FIGS. 1(A) and 1(B) are set is reproduced, the reproducing device selects one piece of variation data from the individual segment region and reproduces the selected variation data.

When the selective reproducing process is performed on the variation data, the reproducing device performs a jump process of a reading header (an optical header) that reads disk record data as necessary.

In other words, a jump reproducing process of jumping a variation data record region which is not a reproduction target recorded on the disk, positioning the reading header at a recording position of the variation data serving as the reproduction target, and performing reproduction.

A predetermined time is required for the jump process of the header, and when the jump process time is increased, a reproduction interruption may occur.

Figure 5:
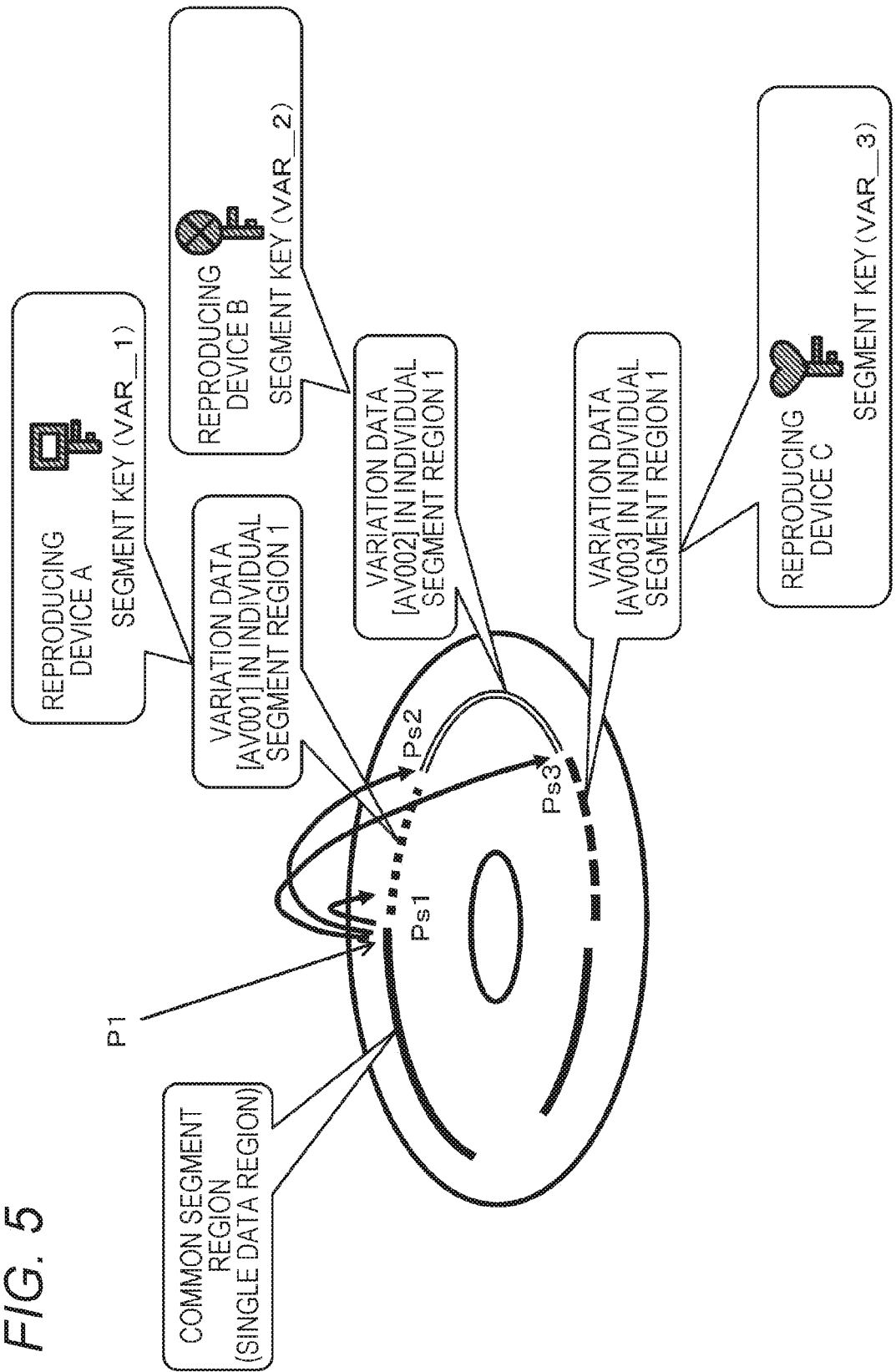
FIG. 5 is a diagram for describing an example of a jump process necessary when content including an individual segment region and a common segment region is reproduced.

FIG. 5 illustrates a specific example of the jump process. In the disk, the individual segment region is set subsequently to the common segment region, but a plurality of pieces of variation data are recorded in the individual segment region. In the example illustrated in FIG. 5, three pieces of variation data [AV001 to AV003] are recorded.

For example, a reproduction path of the reproducing device A is a path in which the variation data [AV001] is reproduced. In this case, the reproducing device A moves from an end position P of the common segment region to a recording start position Pa1 of the variation data [AV001] and performs the reproducing process.

A reproduction path of the reproducing device B is a path in which the variation data [AV002] is reproduced. In this case, the reproducing device B moves from the end position P of the common segment region to a recording start position Pa2 of the variation data [AV002] and performs the reproducing process.

A reproduction path of the reproducing device C is a path in which the variation data [AV003] is reproduced. In this case, the reproducing device C moves from the end position P of the common segment region to a recording start position Pa3 of the variation data [AV003] and performs the reproducing process.

As can be seen from FIG. 5, a jump distance of the reproducing device C is very long. During the jump process, the reproducing process of the reproduction data in the common segment region stored in a buffer of the reproducing device is performed. However, when a jump execution time is increased, a reproduction time by the reproduction data in the common segment region stored in the buffer may be exceeded. If such a situation occurs, the reproduction interruption occurs.

This problem is more likely to occur as a continuous record region of one piece of variation data set in one individual segment region on the disk is long.

As described above, when the content in which the common segment region and the individual segment region are set is reproduced, the reproducing device is likely to undergo the reproduction delay or the reproduction interruption when the jump process time is long unless the reproducing device reproduces the variation data while selecting one piece of variation data from the individual segment region.

[4. Example of Setting Individual Segment Region Data (Variation Data) in Units of Aligned Units]

As described above, when a recording length of one piece of individual segment region data (variation data) is set to be long, there is a problem in that the reproduction interruption is likely to occur.

A configuration for solving the problem will be described below.

An example in which the individual segment region data (variation data) has a configuration in which a plurality of aligned units are arranged.

Further, the aligned unit is configuration data of a clip AV stream file specified in the BD format.

Data such as an image serving as the reproduction target is divided into source packets configured with 192-B (byte) data.

The aligned unit is 6144-B (byte) data configured with 32 source packets.

[4-1. Exemplary Configuration of Disk Record Data]

First, exemplary configurations of the source packet, the aligned unit, and the disk record data will be described.

A recording format (BDMV format) when content such as a movie is recorded on the Blu-ray (registered trademark) (BD) disc will be described with reference to FIG. 6.

In the BDMV format, data such as images (videos), audios, and subtitles serving as the reproduction target data is stored in the clip AV stream file and recorded.

The clip AV stream file is a file which is set using a 188-byte TS packet as a component. The transport stream packet, that is, the TS packet is arranged in accordance with the MPEG-2 TS format.

The MPEG-2 TS format is a format which is standardized in ISO 13818-1 and used for data recording in, for example, the Blu-ray (registered trademark) (BD) disc, digital broadcasting, and the like.

Further, encoded data of videos, audios, and still images that is allowed to be stored in accordance with the MPEG-2 TS format is, for example, the following encoded data:

video: MPEG-1, MPEG-2, MPEG-4 AVC (AVC), and MPEG-4 HEVC (HEVC);

audio: MP1, MP2, MP3, linear PCM, and DTS; and still image: JPEG.

For example, each encoded data is dispersedly stored in the TS packets specified in the MPEG-2 TS.

Figure 6:
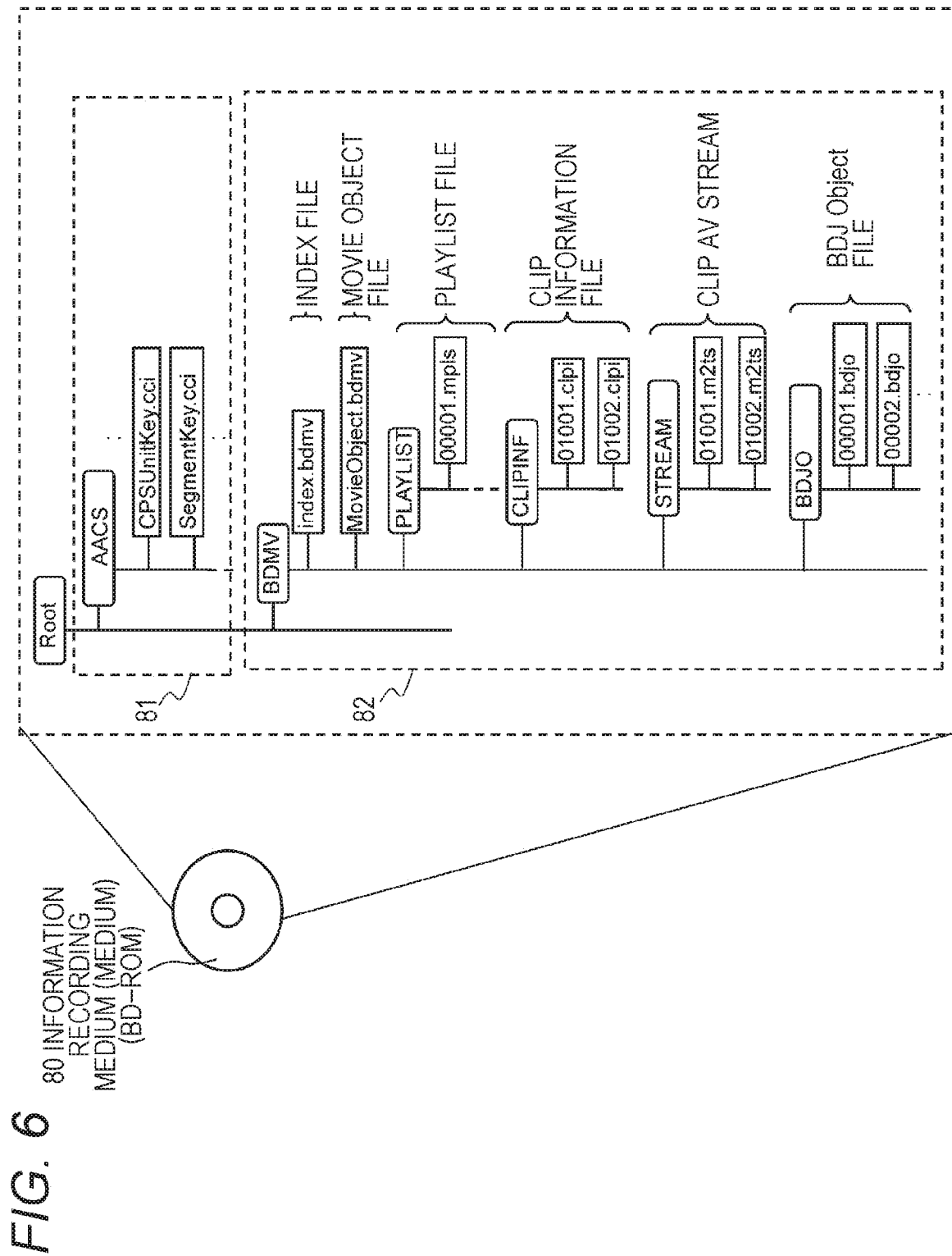
FIG. 6 is a diagram for describing an exemplary directory configuration of data recorded on a medium in accordance with a BDMV format.

FIG. 6 is a diagram illustrating a directory of record data, for example, according to the BDMV format recorded on an information recording medium 80 which is a ROM type Blu-ray (registered trademark) (BD) disc.

The directory is divided into a management information setting unit 81 (an AACS directory) and a data portion 82 (a BDMV directory) as illustrated in FIG. 6.

The CPS unit key file which is an encryption key of data, a segment key file, a usage control information file, and the like are stored in the management information setting unit 81 (AACS directory).

The CPS unit key applied to decryption of the encrypted data set in the common segment region (single data region) other than the individual segment region illustrated in FIGS. 1(A) and 1(B) is stored in the CPS unit key file as encryption key data.

The reproducing device can acquire the CPS unit key from the CPS unit key file through the process of applying the device key stored in the reproducing device or data stored in the disk.

The segment key applied to decryption of the variation data set in the individual segment region illustrated in FIGS. 1(A) and 1(B) is stored in segment key file as encryption key data.

The reproducing device can acquire the segment key from the segment key file through the process of applying the device key stored in the reproducing device or the data stored in the disk.

Here, as described above, the segment key that can be acquired from the segment key file using the device key stored in one reproducing device is only one segment key for each individual segment region.

In other words, it is possible to acquire only one segment key for decrypting one of a plurality of pieces of variation data set in the individual segment region.

The combination of the segment keys that can be acquired from the segment key file differs in accordance with the device key stored in the reproducing device.

The reproduction path corresponding to the reproducing device is set in accordance with this setting.

Further, the details of the process of acquiring the CPS unit key from the CPS unit key file and the process of acquiring the segment key from the segment key file are described in Patent Document 1 (Japanese Patent Application Laid-Open No. 2006-236121). Even in the process of the present disclosure to be described below, the process of acquiring the CPS unit key and the segment key is performed through a process similar to the process disclosed in Patent Document 1.

On the other hand, for example, the following files are recorded below the BDMV directory of the data portion 82:
an index file;
a movie object file;
a playlist file;
a clip information file;
a clip AV stream file; and
a BDJO file.

Title information serving as index information applied to the reproducing process is stored in the index file.

The movie object file is a reproducing process program applied to the content reproducing process. For example, a predetermined reproducing process program is selected in accordance with the title included in the index file, and reproduction of the content is controlled.

The playlist file is a file specifying, for example, a reproduction order of content according to program information of the reproducing process program designated by the title and includes designation information for clip information including reproduction position information.

The clip information file is a file designated by the playlist file and includes the reproduction position information of the clip AV stream file and the like.

The clip AV stream file is a file storing AV stream data serving as the reproduction target.

The BDJO file is a file storing execution control information of the file in which a JAVA (registered trademark) program, commands, and the like are stored.

A sequence in which the information processing device reproduces content recorded in the information recording medium is as follows:

(a) first, a specific title is designated from the index file through a reproduction application;

(b) a reproduction program associated with the designated title is selected;

(c) a playlist specifying a reproduction order of content and the like is selected in accordance with the program information of the selected reproduction program;

(d) in accordance with the clip information defined in the selected playlist, an AV stream or a command serving as actual content data is read out, and reproduction of the AV stream or a process of executing the command is performed.

FIG. 7 illustrates the following data recorded in the information recording medium 80:
a playlist file;
a clip information file; and
a clip AV stream file.

FIG. 7 is a diagram for describing a correspondence relation between these data.

An AV stream including video and audio data serving as actual reproduction target data is recorded as the clip AV stream file, and the playlist file and the clip information file are specified as management information and a reproduction control information file of the AV streams.

As illustrated in FIG. 7, files of a plurality of categories can be classified into the following two layers:
a playlist layer including the playlist file; and
a clip layer configured with the clip AV stream file and the clip information file.

Further, one clip information file is associated with one clip AV stream file, a pair thereof is regarded as one object, and they are referred to collectively as a "clip" or a "clip file."

The management information such as an entry point (EP) map in which detailed information of data included in the clip AV stream file, for example, I picture position information of MPEG data is recorded in the clip information file.

The clip AV stream file stores data in which MPEG-2 TS is arranged in accordance with a specified structure of the BDMV format. This configuration will be described later in detail with reference to FIGS. 8(A) to 8(E).

Further, the clip information file stores, for example, the management information used for acquiring a reproduction start position of data stored in the clip AV stream file, and the like such as correspondence data such as a data position of a byte sequence data of the clip AV stream file, a reproduction time position serving as a reproduction start point (EP) when it is developed on the time axis, and the like.

The playlist includes information indicating the reproduction start position of the clip or an access point corresponding to the reproduction end position through a time stamp which is information on the time axis.

For example, it is possible to acquire a data read position of the clip AV stream file, that is, an address serving as the reproduction start point with reference to the clip information file on the basis of the time stamp indicating an elapsed reproduction time position from the start point of the content.

The clip information file is used to detect address information at which decoding of streams in the clip AV stream file starts from the time stamp.

As described above, the playlist file includes designation information designating a reproduction interval for reproducible data included in the clip (=clip information file+clip AV stream file) layer.

One or more play items are set in the playlist file, and each of the play items includes the designation information designating the reproduction interval for reproducible data included in the clip (=clip information file+clip AV stream file) layer.

For example, the clip AV stream file in which actual data of video and audio serving as the reproduction target has an MPEG-2 TS file structure illustrated in FIGS. 8(A) to 8(E).

The MPEG-2 TS format has the following features as illustrated in FIGS. 8(A) to 8(E).

1) The MPEG-2 TS file is configured with an integer number of aligned units.

2) A size of the aligned unit is 6 kB (=6144 bytes (2048×3 bytes)).

3) The aligned unit starts from a first byte of the source packet.

4) The source packet has a length of 192 bytes. One source packet is configured with TP extra header and the TS packet. TP extra header has a length of 4 bytes, and TS packet has a length of 188 bytes.

5) The TS packet has a header (TP header) and a payload portion. Encoded data of any one type of data such as video, audio, and the like is stored in the payload of one TS packet.

6) A program ID (PID) indicating a data type of the payload is recorded in the header (TP header) of the TS packet.

7) The payload of the TS packet is configured with a packet (packetized elementary stream (PES)) storing an elementary stream (ES) serving as encoded data such as video or audio, a PES header, and the like.

8) A presentation time stamp (PTS) indicating reproduction time information of the elementary stream (ES) stored in a subsequent PES packet, and a decoding time stamp (DTS) indicating a decoding process time are recorded in the PES header.

Further, the following data is stored in the header information of the TS packet as illustrated in FIG. 8(E):

(a) a synchronization byte (Sync byte);
(b) a transport error indicator (Transport error indicator);
(c) a payload unit start indicator (Payload_unit_start_indicator);
(d) a transport priority (Transport priority);
(e) a program ID (PID);
(f) transport scrambling control;
(g) adaptation field control;
(h) a continuity counter; and
(i) an adaptation field.

[4-2. Example in Which Variation Data is Set in Units of Aligned Units]

Next, an example in which variation data is set in units of aligned units will be described.

FIGS. 9(A) and 9(B) are diagrams for describing an example in which the variation data is set in units of aligned units.

FIGS. 9(A) and 9(B) illustrate the following drawings:
FIG. 9(A) individual segment setting state; and
FIG. 9(B) data record state on disk.

As illustrated in FIG. 9(A) the individual segment setting state, the individual segment region is a setting having two pieces of variation data configured with a plurality of aligned units.

In the present embodiment, each individual segment region has only two pieces of variation data.

Each piece of variation data is configured with a plurality of aligned units.

Each aligned unit is 6144-byte data.

An identifier corresponding to the variation data is embedded in each piece of variation data set in the individual segment region as a digital watermark.

In the example illustrated in FIGS. 9(A) and 9(B), aligned units (0b) and aligned units (1b) are illustrated as aligned units in which different embedded digital watermark data are recorded.

The individual segment region and the common segment region are alternately set. The number of settings of the individual segment region set in one title correspondence content can be variously set. For example, the number of settings is about several hundreds. The reproducing device decrypts and reproduces the content in accordance with the reproduction path set in each reproducing device by applying a plurality of types of segment keys and one CPS unit key.

For example, as illustrated in FIG. 9(A), the reproducing device A selects and reproduces the aligned unit (0b) serving as the variation data in an individual segment region-1, and selects and reproduces the aligned unit (1b) serving as the variation data in an individual segment region-2.

The reproduction path is decided by the device key held in the reproducing device.

FIG. 9(B) illustrates a data record configuration on the disk. As illustrated in FIG. 9(B), as data in the individual segment region, the variation data is alternately recorded in units of aligned units of 6144 B (bytes). In other words, the aligned unit (0b) and the aligned unit (1b) are alternately recorded.

When data is recorded as described above, it is possible to reduce the jump distance executed by the reproducing device at the time of data reproduction. For example, when the variation data configured with the aligned units (0b) is selected and reproduced in the individual segment region, it is desirable to perform jumping by the jump distance corresponding to the aligned unit (1b) of 6144 bytes which is non-reproducible target data. 6144-byte data is a small data size, and jumping of a large distance is unnecessary. Therefore, even when an amount of buffered data of reproduction data is small, it is possible to prevent the occurrence of reproduction interruption.

Further, it is also possible to read all pieces of data without performing the jump process, select only data according to the reproduction path from the read data, and reproduce the selected data.

[5. Reproducing Process According to Reproduction Path Allocated to Reproducing Device]

Next, the reproducing process example according to the reproduction path allocated to reproducing device will be described.

The reproducing device reproduces data in the common segment region and one piece of variation data selected according to the reproduction path from a plurality of pieces of variation data in the individual segment region.

The data reproducing process example of the reproducing device will be described with reference to FIG. 10.

FIG. 10 illustrates reproduction paths (P1 to P6) of the reproducing device A.

The path P1 is the common segment region, and the decryption process to which the CPS unit key is applied is performed.

The paths P2 to P4 are the reproducing process of a plurality of aligned units (0b) constituting one piece of variation data in the individual segment region-1, and reproduction is performed through the decryption process to which the segment key (VAR_A0) is applied.

The path P5 is the common segment region, and the decryption process to which the CPS unit key is applied is performed.

The path P6 and the like are the reproducing process of a plurality of aligned units (1b) constituting one piece of variation data in the individual segment region-2, and reproduction is performed through the decryption process to which the segment key (VAR_B1) is applied.

As described above, it is necessary for the reproducing device to selectively acquire different variation data alternately recorded in units of aligned units from each individual segment region one by one, perform the decryption process, and perform the reproduction.

The following example will be described as a specific reproducing process example.

Figure 11:
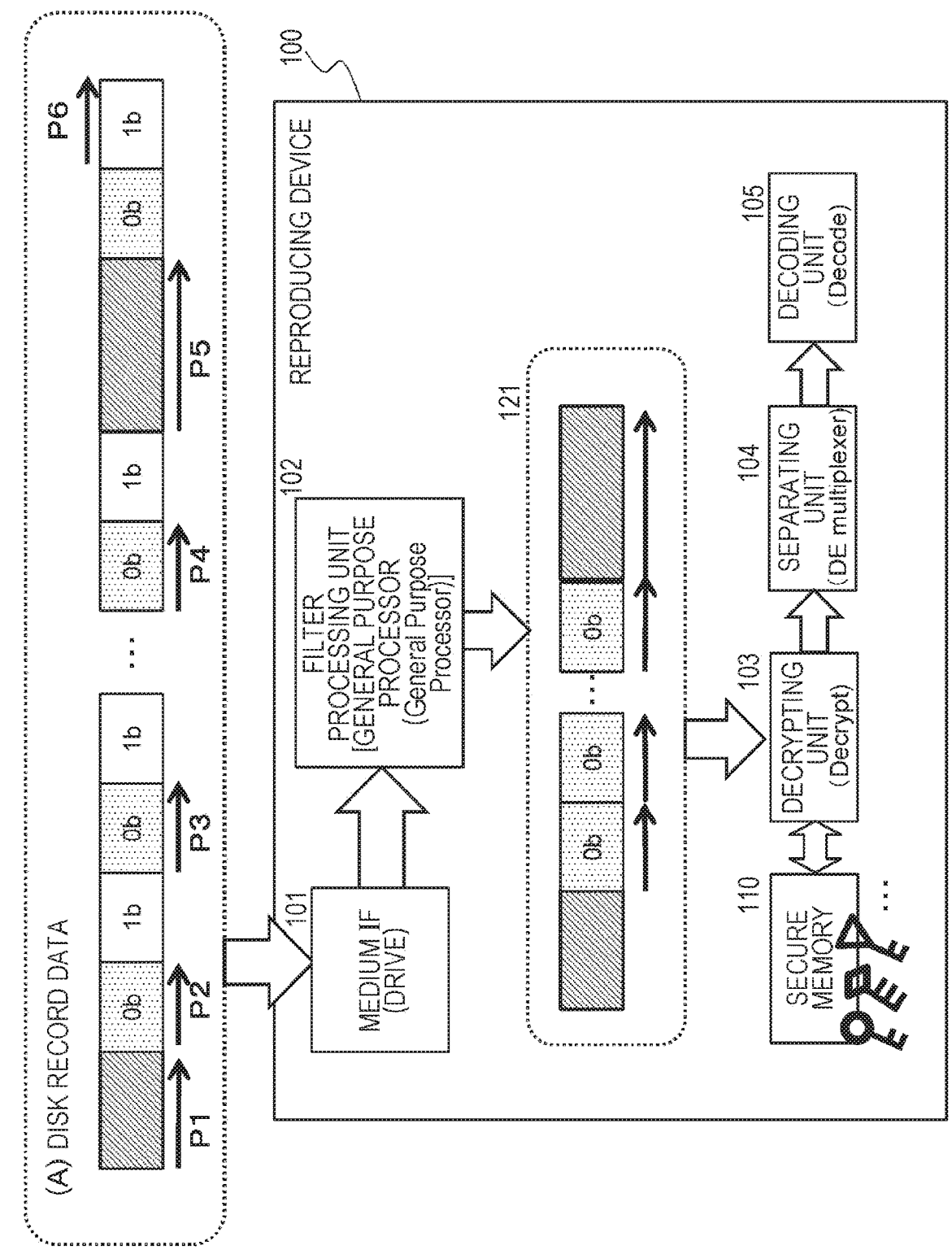
FIG. 11 is a diagram for describing a reproducing process example of a reproducing device.

(Reproducing process example) Reproducing process example of performing filter process through filter processing unit and selectively acquiring and reproducing only data according to reproduction path FIG. 11(A) illustrates the disk record data. Further, reproduction paths of a reproducing device 100 are indicated by arrows (P1 to P6). The reproduction paths are paths similar to the reproduction paths described with reference to FIG. 10.

The path P1 is the common segment region, and the decryption process to which the CPS unit key is applied is performed.

The paths P2 to P4 are the reproducing process of a plurality of aligned units (0b) constituting one piece of variation data in the individual segment region-1, and reproduction is performed through the decryption process to which the segment key (VAR_A0) is applied.

The path P5 is the common segment region, and the decryption process to which the CPS unit key is applied is performed.

The path P6 and the like are the reproducing process of a plurality of aligned units (1b) constituting one piece of variation data in the individual segment region-2, and reproduction is performed through the decryption process to which the segment key (VAR_B1) is applied.

The reproducing device 100 decrypts and reproduces data in the segment region selected according to the reproduction path from the disk record data illustrated in FIG. 11(A).

A medium IF (drive) 101 of the reproducing device 100 illustrated in FIGS. 11(A) and 11(B) reads the disk record data illustrated in FIG. 11(A) and outputs it to a filter processing unit 102.

Further, in this example, all pieces of data are sequentially read and output to the filter processing unit 102 without performing the jump process at the time of data reading.

The filter processing unit 102 is configured with, for example, a general purpose processor.

The filter processing unit 102 acquires the reproduction path information in advance, selects only the reproduction target data of the reproducing device 100 in accordance with the reproduction path information, and outputs the reproduction target data to the decrypting unit (Decrypt) 103.

Further, as described above with reference to FIG. 4, the reproduction path information is acquired through the process to which the device key held in the reproducing device is applied.

In accordance with the reproduction path information, the filter processing unit 102 sequentially selects the aligned units constituting one piece of variation data selected from the common segment region data and the individual segment region data, generates reproduction path association data 121, and outputs the reproduction path association data 121 to the decrypting unit 103.

The decrypting unit (Decrypt) 103 receives the reproduction path association data 121 as an input, and performs the decryption process to which the key corresponding to each segment region is applied.

The decryption process to which the CPS unit key acquired from the CPS unit key file is applied is performed on the common segment region.

The decryption process to which the segment key acquired from the segment key file is applied is performed on the aligned units constituting the variation data selected from the individual segment region.

Further, the CPS unit key file and the segment key file are recorded on the disk together with the content. The keys acquired from the files are stored in a secure memory 110 and successively, switched and used.

Further, the segment key which the reproducing device 100 can acquire from the segment key file is only the key applied to decryption of one piece of variation data selected in accordance with the reproduction path from a plurality of pieces of variation data in one segment region for one individual segment region.

In this case, it is possible to acquire the segment key applied to decryption of the aligned units in the individual segment region included in the reproduction path association data 121.

The decrypting unit (Decrypt) 103 receives the reproduction path association data 121 as an input, performs the decryption process to which the key corresponding to each segment region is applied, and outputs the decrypted data to the separating unit (demultiplexer) 104.

The separating unit (demultiplexer) 104 separates the decrypted data input from the decrypting unit (Decrypt) 103 in accordance with a type of data (videos, audios, or subtitles) and outputs the separated data to a decoding unit (Decode) 105.

Further, for example, the data separation is performed with reference to the PID recorded in the header of the TS packet storing each data.

The decoding unit 105 performs the decoding process according to each encoded state on each piece of encoded data of videos, audios, and subtitles.

A decoding result generated through the decoding process of the decoding unit 105 is output as the reproduction data.

[6. Selection Process Example of Variation Data in Reproducing Device]

In the above example, each piece of variation data is configured with the 6144-byte aligned unit.

The reproducing device selects one aligned unit (=variation data) serving as the reproduction target from a plurality of aligned units which are a plurality of pieces of variation data set in each individual segment region, decrypts, and perform the reproducing process.

It is necessary for the reproducing device to select one aligned unit serving as the reproduction target from each individual segment region in accordance with its own reproduction path.

An example of setting the variation data identifier to be set in each aligned unit to be applied to the aligned unit selection process will be described with reference to FIGS. 12(A) and 12(B).

Figures 12A, 12B:
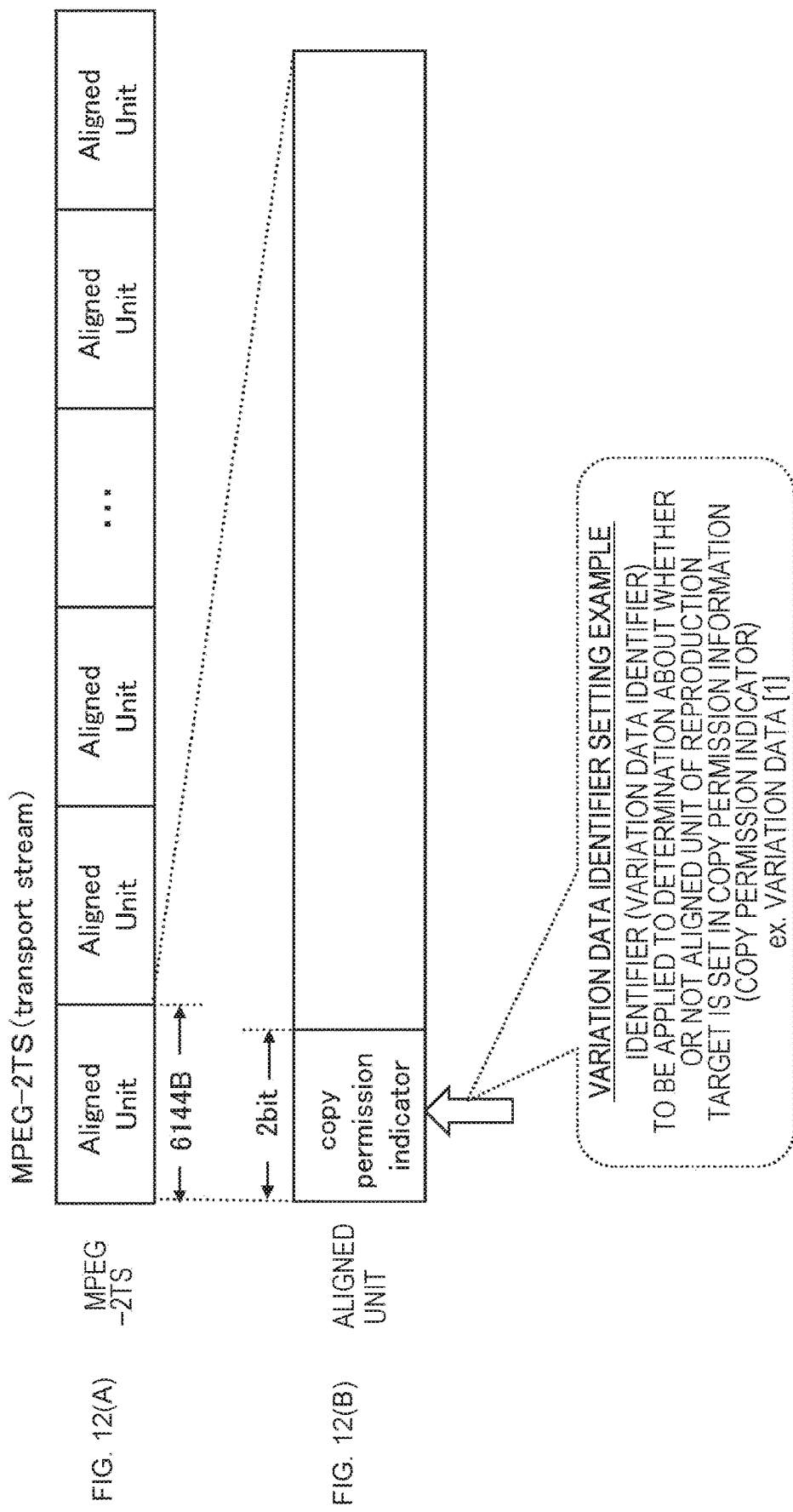
FIGS. 12(A) and 12(B) are diagrams for describing an example of setting a variation data identifier.

FIGS. 12(A) and 12(B) illustrate configurations of the following data:

FIG. 12(A) the MPEG-2 TS file; and

FIG. 12(B) the aligned unit.

The aligned unit of 6144 bytes illustrated in FIG. 12(B) corresponds to one piece of variation data in the second example.

As illustrated in FIG. 12(B), a 2-bit copy permission information setting portion (a copy permission indicator) is set in the aligned unit of 6144 bytes.

The variation data identifier can be recorded in the copy permission information setting portion (the copy permission indicator).

In other words, the variation data identifier indicating whether or not an aligned unit is an aligned unit serving as the reproduction target is set in the copy permission information setting portion (the copy permission indicator).

The following variation data identifiers are stored in the copy permission information setting portion (the copy permission indicator) set in the aligned unit:

variation data [1];
variation data [2];
:
Variation data [n]

An example in which the variation data identifier indicating whether or not an aligned unit is an aligned unit serving as the reproduction target is set in the copy permission information setting portion (the copy permission indicator) will be described with reference to FIGS. 13(A) and 13(B).

FIG. 13(A) is a diagram illustrating an example of setting a bit value in the copy permission information setting portion in accordance with a related art.

For example, when the set bit value=00, it indicates that the reproduction target data stored in this aligned unit is unencrypted data.

Further, when the set bit value=11, it indicates that the reproduction target data stored in this aligned unit is encrypted data.

The other bit values such as 01 and 10 are neither defined nor used.

FIG. 13(B) is an example in which the variation data identifier indicating whether or not an aligned unit is an aligned unit serving as the reproduction target is set in the copy permission information setting portion (the copy permission indicator) in accordance with the present embodiment.

Bits values are defined as follows.

When the set bit value=00, it indicates that the reproduction target data stored in this aligned unit is unencrypted data.

Further, when the set bit value=11, it indicates that the reproduction target data stored in this aligned unit is encrypted data.

These are similar to those in the related art.

Furthermore, when the set bit value=01, it indicates that the reproduction target data stored in this aligned unit is encrypted data, one piece of variation data set in the segment region, and encrypted data corresponding to variation data identifier=variation data [1].

When the set bit value=10, it indicates that the reproduction target data stored in this aligned unit is encrypted data, one piece of variation data set in the segment region, and encrypted data corresponding to variation data identifier=variation data [2].

For example, it is possible to set the variation data identifier in the copy permission information setting field of the aligned unit as described above.

The reproducing device sequentially reads a plurality of aligned units corresponding to a plurality of pieces of variation data set in the segment region, and determines whether or not an aligned unit is an aligned unit storing the reproduction target data of the reproducing device on the basis of the setting of the variation data identifier set in the copy permission information setting field of each aligned unit.

[7. Example in which Variation Data Identifier is Set in Adaptation Field of TS Packet Header]

In the configuration described above with reference to FIGS. 12(A) and 12(B) and 13(A) and 13(B), that is, the configuration in which the variation data identifier is set in the copy permission information, the following two variation data identifiers can be set:

01: variation data [1]; and
10: variation data [2].

The copy permission information (the copy permission indicator) set in the TS packet header of the TS packet is 2-bit data, and a maximum of 4 types of data can be set as described with reference to FIGS. 13(A) and 13(B). Two types (00 and 11) have already been defined, and two types of variation data identifiers can be recorded using the remaining bit settings (01 and 10).

However, in this setting, only two types of variation data can be set in the individual segment region.

As the number of variation data set in the individual segment region increases, the number of types of settable reproduction paths increases. For example, when a leak source of illegal copy content is specified, as the number of types of reproduction paths increases, a range in which the reproducing device can specify the leak source decreases.

Therefore, a configuration in which the number of variation data set in the individual segment region is set to be large is desirable.

For example, as illustrated in FIG. 14, if 8 types of variation data configured with aligned units in which 8 types of identifiers of 000 to 111 are set in the individual segment region is set, the leak source of illegal copy content can be specified in a narrower range.

In FIG. 14, one rectangular region illustrated in each individual segment region is one 6144-byte aligned unit.

The reproducing device selects and reproduces one of 8 types (000b to 111b) of variation data in in units of individual segment regions.

For example, when the variation data (000b) is selected in the individual segment region-1 in accordance with the reproduction path information, a plurality of aligned units of 000b are sequentially selected and reproduced.

A record configuration on the disk is illustrated in FIG. 15. In each individual segment region, 8 types of different identification data embedded aligned units of 000b to 111b are repeatedly recorded in units of aligned units in which each piece of variation data is 6144 B (bytes) as illustrated in FIG. 15.

When data is recorded as described above, the reproducing device selects and reproduces an aligned unit in which one type of identifier (any one of 000b to 111b) is recorded in accordance with the reproduction path in the individual segment record region. For example, when the aligned unit of 000b is selected and reproduced, it is necessary to jump data record regions of seven aligned units in each individual segment region. However, since the jump distance is a data recording interval of (6144×7) bytes which is an extremely short distance, there is no possibility of the occurrence of reproduction interruption or the like.

Therefore, even when the amount of buffered data of the reproduction data is small, it is possible to prevent the occurrence of reproduction interruption.

Further, it is also possible to read all pieces of data without performing the jump process and select only data according to the reproduction path from the read data, and reproduce the selected data.

When the aligned units constituting various variation data are recorded on the disk, the reproducing device should select an aligned unit to be selected and reproduced in accordance with the reproduction path information as illustrated in FIG. 15.

In the example illustrated in FIGS. 14 and 15, it is necessary to sequentially select the aligned units corresponding to one piece of variation data from 8 types of different variation data.

The reproducing device can acquire the reproduction path information during the reproducing process as described above with reference to FIG. 4. The reproduction path information generated in step S23 illustrated in FIG. 4 is information indicating the variation data to be selected and reproduced in each individual segment region. For example, the reproduction path information is information indicating the variation data to be selected and reproduced in each individual segment region and configured with, for example, data in which the identifier of the variation data to be selected and reproduced in the individual segment region is set as follows:

individual segment 1: variation data identifier AV002;
individual segment 2: variation data identifier AV001;
individual segment 3: variation data identifier AV003; and
individual segment 4: variation data identifier AV002.

The reproducing device compares the reproduction path information with the variation data identifier recorded in each aligned unit read from the disk, selects an aligned unit in which the variation data identifier corresponding to the reproduction path information is recorded, and decrypts and reproduces the selected aligned unit.

However, in the configuration described above with reference to FIGS. 12(A) and 12(B) and FIGS. 13(A) and 13(B), that is, the configuration in which the variation data identifier is set in the copy permission information, only the following two variation data identifiers can be set:

01: variation data [1]; and
10: variation data [2].

As described above with reference to FIGS. 12(A) and 12(B) and FIGS. 13(A) and 13(B), since the copy permission information has the 2-bit configuration, and the bit values of 00 and 11 are already specified, only the two types of identifiers mentioned above can be set.

Therefore, when three or more types of variation data are set in the individual segment region, it is unable to use the configuration in which the variation data identifier is set in the copy permission information.

An exemplary configuration in which the variation data identifier is recorded in a plain text data region set at a head of an aligned unit will be described below.

Specifically, the variation data identifier is recorded in the adaptation field of the TS packet header of the source packet at the head of the aligned unit. It is possible to record, for example, three or more variation data identifiers using the adaptation field. Specifically, for example, when 8 bits in the adaptation field are secured as a variation data identifier record region, it is possible to record 256 types of variation data identifiers of 00000000 to 11111111.

The adaptation field set in the TS packet header of the source packet will be described with reference to FIGS. 16(A), 16(B), 16(C) and 16(D).

FIGS. 16(A) and 16(B) are diagrams for describing the MPEG-2 TS file structure, similarly to that described above with reference to FIGS. 8(A), 8(B), 8(C), 8(D) and 8(E).

As illustrated in FIGS. 16(A), 16(B), 16(C) and 16(D), the MPEG-2 TS format has the following features.

(1) An MPEG-2 TS file is configured with an integer number of aligned units.

(2) A size of the aligned unit is 6 kB (=6144 bytes (2048×3 bytes)).

(3) The aligned unit has a configuration in which a plurality of source packets of 192 bytes are collected.

The source packet includes a TS packet of 188 bytes. The TS packet includes a header (a TP header) and a payload part. Encoded data of one type of data such as videos, audios, and the like is stored in the payload of one TS packet.

(4) 4-byte fixed information from Syncbyte to Continuitycounter is recorded in the TS packet header in addition to the PID indicating a data type of the payload as illustrated in FIG. 16(D).

The adaptation field is set subsequently to the 4-byte fixed information.

The adaptation field is a region in which data is permitted to be freely recorded to some extent, and for example, control data or the like usable by a specific reproduction application can be recorded in the adaptation field.

In the present embodiment, the variation data identifier is recorded in the adaptation field of the TS packet header of the source packet at the head of the aligned unit as described above. For example, 256 types of variation data identifiers of 00000000 to 11111111 can be recorded using the adaptation field.

FIG. 17 illustrates an example of data when 256 types of variation data identifiers of 00000000 to 11111111 are recorded in the adaptation field.

The variation data identifier of 00000000 indicates that the aligned unit in which this identifier is recorded is an aligned unit associated with variation data [0].

The variation data identifier of 00000001 indicates that the aligned unit in which this identifier is recorded is an aligned unit associated with variation data [1].

The variation data identifier of 11111111 indicates that the aligned unit in which this identifier is recorded is an aligned unit associated with variation data [255].

As described above, for example, 256 types of variation data identifiers of 00000000 to 11111111 can be recorded using the adaptation field.

In the example illustrated in FIG. 17, an 8-bit (1 byte) variation data identifier is set. The number of bits used as the variation data identifier can be set variously. For example, when 3 bits are set, 8 types of variation data identifiers of 000 to 111 corresponding to the example illustrated in FIG. 14 can be recorded.

Further, in the 6144-byte aligned unit, only first 16 bytes set as plain text data, and the remaining bytes are configured with encrypted data as illustrated in FIG. 16(B).

It is necessary to perform the process in which the reproducing device reads the variation data identifier from the aligned unit and confirms the variation data identifier before performing the decryption process, and it is necessary to record the variation data identifier in the 16-byte plain text data.

The adaptation field is used as a record region for various data to be applied to content reproduction.

One of them is a program clock reference (PCR) time stamp.

The PCR time stamp is time stamp information used for controlling a reproduction time of data reproduction of images or the like stored as the payload in the TS packet, and for example, in the specification of BD-ROM, one PCR time stamp is specified to be necessarily recorded within a reproduction time of 100 msec.

In other words, it is necessary to set the source packet including the TS packet in which the PCR time stamp is recorded at intervals of within 100 msec.

The PCR time stamp is recorded in the adaptation field of the TS packet header.

Figure 18A:
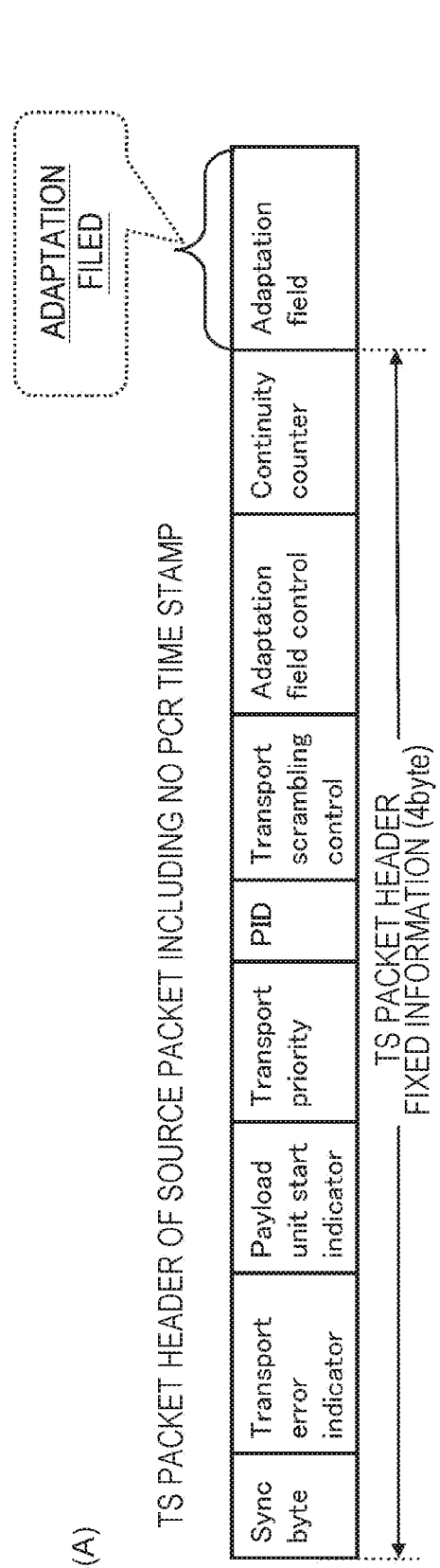
FIGS. 18(A) and 18(B) are diagrams for describing an exemplary configuration of a TS packet header including a TS packet header including no PCR time stamp.
Figure 18B:
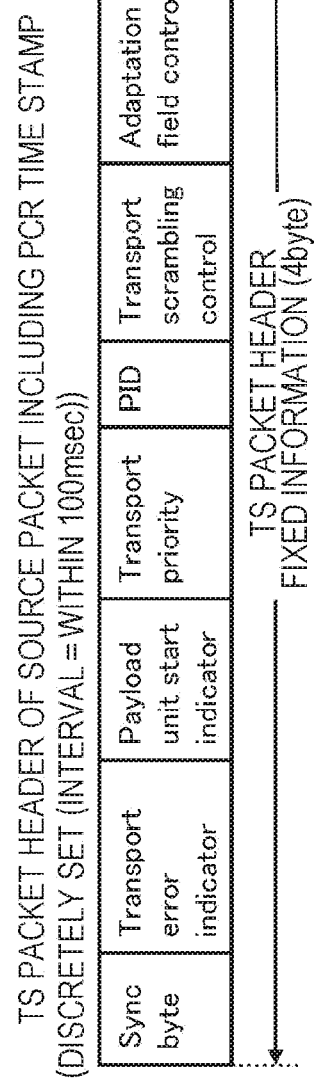

FIGS. 18(A) and 18(B) illustrate exemplary configurations of the following two TS packet headers:

FIG. 18(A) is a TS packet header of a source packet including no PCR time stamp; and FIG. 18(B) is a TS packet header of a source packet in which the PCR time stamp is recorded.

The source packets in which the TS packet headers having at least two different configurations are set are mixed in the MPEG-2 TS format data.

FIG. 19 illustrates an exemplary configuration of an aligned unit in which such different source packets are mixed.

One source packet having the TS packet header in which the PCR time stamp is recorded which is illustrated in FIG. 18(B) is necessarily set within an interval of 100 msec as illustrated in FIG. 19.

When the PCR time stamp is recorded in the adaptation field, the record region of the variation data identifier moves to the second half of the adaptation field, and as a result, the record region of the variation data identifier is not in the plain text region of first 16 bytes specified in the aligned unit (see FIG. 16(B)) but in the encrypted region.

This problem will be described with reference to FIGS. 20(A) and 20(B) and the subsequent drawings.

FIGS. 20(A) and 20(B) illustrate FIG. 20(A) an aligned unit of 6144 bytes and FIG. 20(B) a head data region (plain text data region) of the source packet at the head of the aligned unit.

FIGS. 20(A) and 20(B) illustrate an example in which the PCR time stamp is not recorded in the adaptation field.

The head data region of the source packet illustrated in FIG. 20(B) corresponds to the plain text region of 16 bytes.

The head data region of the source packet illustrated in FIG. 20(B) is configured with the following data from the head:

(1) a TP extra header of 4 bytes
(2) TS packet header fixed information of 4 bytes (see FIG. 16(D))
(3) adaptation field configuration information of 2 bytes; and
(4) a variation data identifier record region of 6 bytes or less.

The 16-byte plain text region at the head of the aligned unit can be configured with the data of (1) to (4).

In other words, it is possible to secure the plain text record region of a maximum of 6 bytes as the variation data identifier record region. For example, when one byte (8 bits) can be secured, 256 types of variation data identifiers of 00000000 to 11111111 can be recorded.

Next, an example in which the PCR time stamp is recorded in the adaptation field will be described with reference to FIGS. 21(A) and 21(B).

FIGS. 21(A) and 21(B) illustrate FIG. 21(A) an aligned unit of 6144 bytes and FIG. 21(B) a head data region of the source packet at the head of aligned unit.

The head data region of the source packet illustrated in FIG. 21(B) indicates a 16-byte plain text region and an encrypted data region subsequent thereto.

The head data region of the source packet illustrated in FIG. 21(B) is configured with the following data from the head.

(1) a TP extra header of 4 bytes;
(2) TS packet header fixed information of 4 bytes (see FIG. 16(D));
(3) adaptation field configuration information of 2 bytes; and
(4) a PCR time stamp record region of 6 bytes.

The entire 16-byte plain text region at the head of the aligned unit is used by the data of (1) to (3) and (4) the PCR time stamp.

As a result, the record region of the variation data identifier recorded subsequently to the PCR time stamp is not in the plain text region of first 16 bytes of the aligned unit but belongs to the encrypted data region.

Thus, when the record region of the variation data identifier belongs to the encrypted data region, the reproducing device is unable to acquire the variation data identifier from the plain text data region of the aligned unit.

Therefore, it is unable to select the aligned unit (variation data) serving as the reproduction target in accordance with the reproduction path information.

In order to prevent this situation from occurring, when content is edited, content is generated so that the PCR time stamp is not set in the source packet set in the head region of the aligned unit.

A specific example will be described with reference to FIG. 22.

Figure 22:
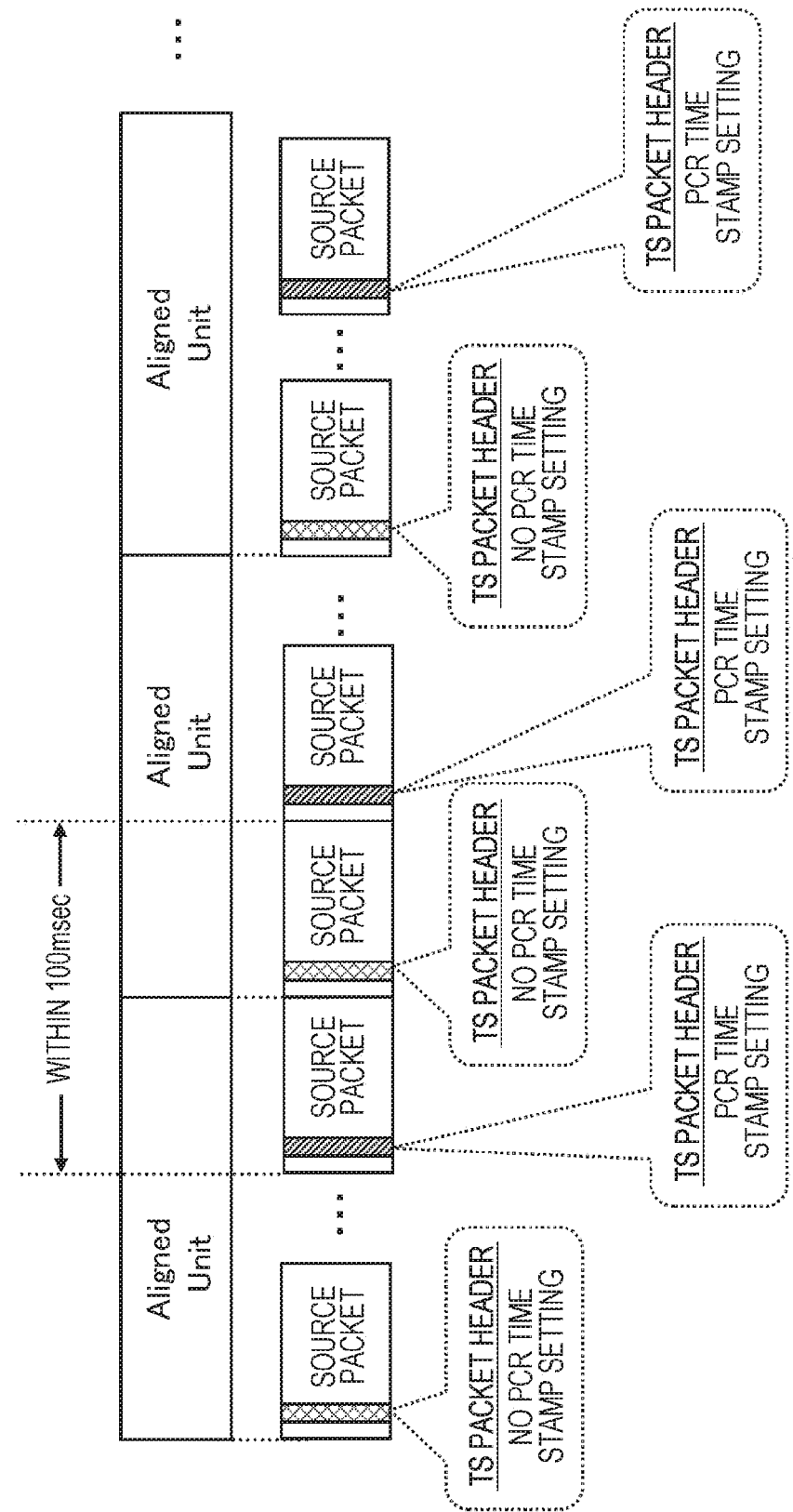
FIG. 22 is a diagram for describing a configuration of content in which a source packet at a head of an aligned unit is set not to include a PCR time stamp.

FIG. 22 illustrates an arrangement of some 6144-byte aligned units constituting content (MPEG-2 TS format content).

FIG. 22 illustrates three consecutive 6144-byte aligned units.

Each of the aligned units is configured with a 192-byte source packet.

Further, only first 16 bytes of each aligned unit are the plain text data region, and the remaining bytes are the encrypted data region.

A plurality of source packets are set in the aligned unit, but as described above, it is necessary to set the source packet including one PCR time stamp within an interval of a maximum of 100 msec.

In order to observe regulations, a setting is performed such that the PCR time stamp is not recorded in the source packet at the heat of the aligned unit, that is, the source packet in which the 16-byte plain text region is set.

The PCR time stamp is not recorded in the TS packet headers of the source packets set at the head of the three aligned units illustrated in FIG. 22. In other words, the source packet is assumed to include the TS packet header described above with reference to FIGS. 20(A) and 20(B).

When content having such a setting is generated, it is possible to reliably read the variation data identifier from the plain text region of first 16 bytes of the aligned unit as the plain text data.

Figure 23:
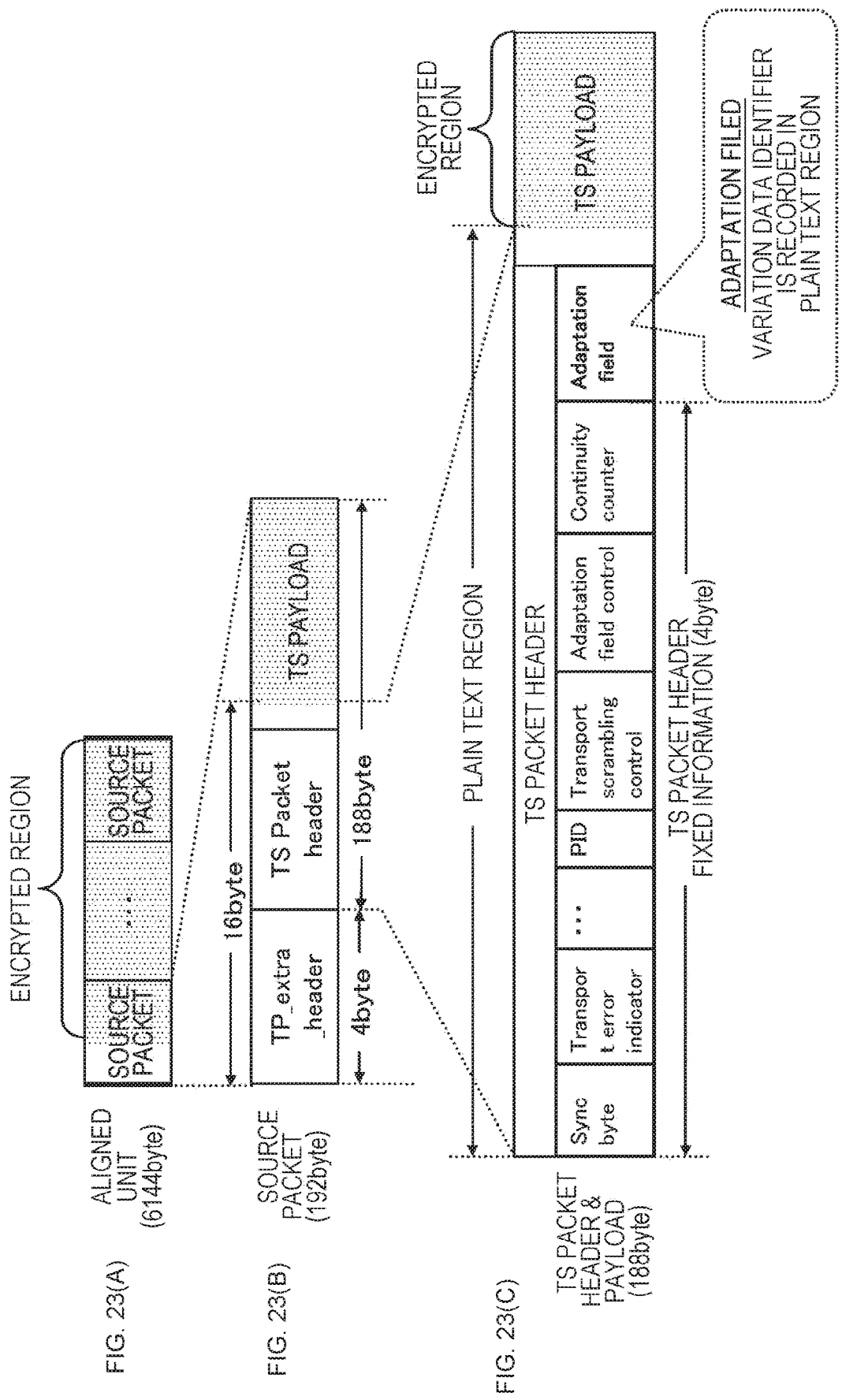
FIGS. 23(A), 23(B) and 23(C) are diagrams for describing a record example of a variation data identifier when a source packet at a head of an aligned unit is set not to include a PCR time stamp.

FIGS. 23(A), 23(B) and 23(C) illustrate a data configuration example of the head of the aligned unit constituting content having a setting in which the PCR time stamp is not recorded in the source packet at the head of the aligned unit.

FIGS. 23(A), 23(B) and 23(C) illustrate the following data:

FIG. 23(A) an aligned unit (6144 bytes);
FIG. 23(B) a source packet at the head of the aligned unit (192 bytes); and
FIG. 23(C) a TS packet in the source packet at the head of the aligned unit (188 bytes).

As illustrated in FIG. 23(C), the TS packet in the source packet at the head of the aligned unit is configured with the TS packet header and the TS payload.

The adaptation field in which the variation data identifier is recorded is included in the TS packet header.

The variation data identifier record region of the adaptation field is definitely included in the first 16-byte region of the aligned unit. In other words, the reproducing device can reliably read the variation data identifier from the plain text data region at the head of the aligned unit.

[8. Content Reproduction Sequence of Reproducing Device]

Next, the reproduction sequence of the reproducing device that reproduces the content having the configuration described above with reference to FIGS. 14 to 23(C) will be described with reference to a flowchart illustrated in FIG. 24.

As illustrated in FIG. 14, the reproduction target content is content having three or more pieces of variation data in the individual segment region, and the variation data is arranged in units of aligned units as illustrated in FIG. 15.

The variation data identifier is recorded in the plain text data region at the head of each aligned unit, and the reproducing device selects the aligned unit in which the variation data identifier matching the reproduction path information (acquired in step S23 of FIG. 4), and decrypts and reproduces the selected aligned unit.

The process sequence performed by the reproducing device will be described with reference to a flowchart illustrated in FIG. 24.

Figure 24:
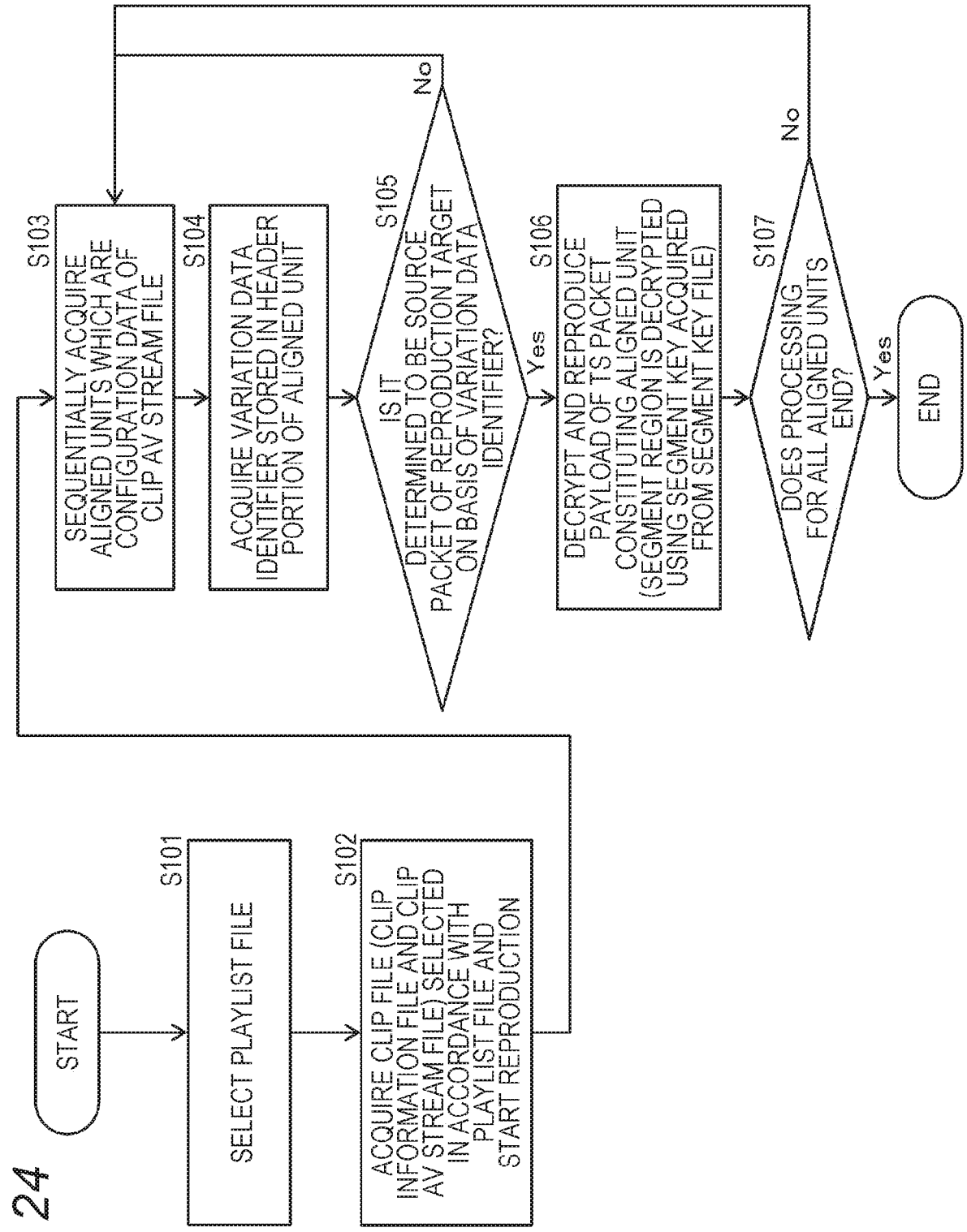
FIG. 24 is a flowchart for describing a content reproduction sequence of a reproducing device.

The flow illustrated in FIG. 24 is a flow for describing a sequence of a process of reproducing content stored in a medium mounted on the reproducing device, for example, the disk such as the BD.

The data processing unit of the reproducing device performs the process according to the flow illustrated in FIG. 24 in accordance with the program stored in the storage unit of the reproducing device.

The data processing unit includes a CPU having a program execution function and the like.

A process of each step will be sequentially described below.

(Step S101)

First, the data processing unit of the reproducing device acquires, for example, the playlist file which is a reproduction control information file for reproducing the reproduction target content specified by the user.

Each piece of data according to the directory described above with reference to FIG. 6 is stored in the disk having the reproduction target content therein.

The reproducing device selects the playlist file to be applied to reproduce reproduction-designated content by the user.

(Step S102)

Next, in step S102, the reproducing device acquires the clip file (the clip information file and the clip AV stream file) selected in accordance with the playlist file selected in step S101, and starts the reproducing process.

As described above with reference to FIGS. 6 and 7, the playlist file is associated with the clip AV stream file having the reproduction target content stored therein and the clip information file.

The reproducing device acquires the clip file (the clip AV stream file+the clip information file) having the reproduction target content stored therein in accordance with description of the playlist file.

(Step S103)

Next, in step S103, the reproducing device sequentially acquires the aligned units which are the configuration data of the clip AV stream file selected from the playlist file.

(Step S104)

Next, in step S104, the reproducing device acquires the variation data identifier stored in the adaptation field in the TS packet header of the source packet at the head of the acquired aligned unit.

As described above with reference to FIGS. 15 to 23(C), the variation data identifier stored in the adaptation field in the TS packet header of the source packet at the head of the aligned unit is included in the first 16-byte plain text data region of the aligned unit.

Therefore, the reproducing device can read the variation data identifier corresponding to the aligned unit from each aligned unit as the plain text data.

(Step S105)

In step S105, the reproducing device determines whether or not the variation data identifier is the aligned unit (variation data) serving as the reproduction target according to the reproduction path of its own device.

Further, the determination process can be obtained from the data of the variation data identifier according to the reproduction path allocated to the reproducing device.

When it is confirmed that the variation data identifier is not the aligned unit (variation data) serving as the reproduction target in accordance with the reproduction path of its own device, the process returns to step S103, a next aligned unit is acquired, and the process starting from step S104 is performed.

On the other hand, when it is confirmed in step S105 that the variation data identifier is the aligned unit (variation data) serving as the reproduction target according to the reproduction path of its own device, that is, when it is a value indicating that the variation data identifier is the aligned unit in which the reproduction data that can be decrypted using the segment key acquirable by the reproducing device is stored, the process proceeds to step S106.

(Step S106)

When it is confirmed in step S105 that it is a value indicating that the value of the variation data identifier is the aligned unit (variation data) serving as the reproduction target according to the reproduction path of its own device, that is, the aligned unit having the decryptable reproduction data stored therein, in step S106, the reproducing device extracts the payload of the TS packet from the configuration data of the aligned unit. The reproduction target data, for example, the encrypted data of image data is stored in the TS payload.

The reproducing device decrypts and reproduces the encrypted data stored in the TS payload.

Further, the key applied to the decryption is the segment key acquired from the segment key file in the case of the variation data in the individual segment region.

The CPS unit key is applied to data in the common segment region other than the individual segment region.

The segment key is a key that can be acquired from the segment key file by applying the device key or the like stored in the reproducing device.

An exemplary configuration of the segment key file is illustrated in FIG. 25.

Each reproducing device can acquire the segment key from the segment key file stored on the disk together with the content by using the key (device key) or the like stored in its own device.

However, the segment key that can be acquired using the device key stored in one reproducing device is set to be able to decrypt only one piece of variation data among a plurality of pieces of variation data set in one individual segment region.

The reproducing device selects one piece of decryptable variation data from one individual segment region using the segment key acquired from the segment key file, performs the decryption process, and reproduces the selected variation data. Further, the decryption process is performed in units of aligned units. One segment key can be used in common for decryption of a plurality of aligned units constituting one piece of variation data in one individual segment region.

A combination of the segment keys that can be acquired from the segment key file differs in accordance with the device key stored in the reproducing device.

The reproducing device selects one piece of decryptable variation data from one individual segment region using the segment key acquired from the segment key file, performs the decryption process, and reproduces the selected variation data.

The following data is stored in the segment key file as illustrated in FIG. 25:

(1) an individual segment region start source packet number (start SPN);

(2) an individual segment region end source packet number (end SPN); and (3-1 to 3-n) variation support encrypted segment keys (VAR_0 to VAR_n).

(1) The individual segment region start source packet number (start SPN) is a source packet identifier identifying a source packet at a start position of each individual segment region.

(2) The individual segment region end source packet number (end SPN) is a source packet identifier identifying a source packet at an end position of each individual segment region.

The data processing unit of the reproducing device determines a region to which the segment key is applied on the basis of the start SPN and the end SPN of each individual segment region.

(3-1 to 3-n) The variation support encrypted segment keys (VAR_0 to VAR_n) are an encrypted segment key acquired by encrypting the segment key applied to decryption of the variation data set in each individual segment region.

Further, this example of the segment key file corresponds to an example in which n pieces of variation data are set in one individual segment region.

Further, as described above, the encrypted segment key can be decrypted through data processing using the device key or the like stored in the reproducing device.

However, one reproducing device can acquire only one segment key as a decryption key for one individual segment region.

Returning to the flow illustrated in FIG. 24, the description of the reproducing process sequence continues.

In step S106, the payload of the TS packet is extracted from the configuration data of the aligned unit, and then the decryption process is performed. The key applied to the decrypting is the segment key acquired from the segment key file in the case of the variation data in the individual segment region. The CPS unit key is applied to data in the common segment region other than the individual segment region.

(Step S107)

In step S107, the reproducing device determines whether or not processing for all the aligned units constituting the reproduction target content has been completed, and when there is a non-processed aligned unit, the process returns to step S103, and the process starting from step S103 is performed on the non-processed aligned unit.

In step S107, when processing for all the aligned units constituting the reproduction target content is determined to have been completed, the process ends.

In the present embodiment, one piece of variation data is configured with one aligned unit of 6144 bytes.

Furthermore, the reproducibility determination process performed by the reproducing device is performed on the basis of data set in the aligned unit.

The following effects are obtained through the configuration of the present embodiment, that is, the setting of the variation data in units of aligned units.

(Effect 1) The reproducibility determination process performed by the reproducing device is performed on the basis of the variation data identifier set in the aligned unit, and it is possible to set more reproduction paths through the setting of the variation data identifier.

(Effect 2) Since the data amount of the aligned unit which is one piece of variation data is as small as 6144 bytes, an occupancy rate of the record region of the disk by the variation data can be suppressed to be small.

(Effect 3) In the present embodiment, at the time of the reproducing process, the reproducing device is configured to sequentially read the aligned units in the segment region and select and reproduce an aligned unit in which the setting of the variation data identifier indicates that it is possible to reproduce, and it is possible to perform the reproduction unaccompanied by the jump process at the time of the reproducing process.

[9. Content Editing, Content Generating Device, and Content Recording Device]

Content having the above configuration, that is, content in which the individual segment region including a plurality of pieces of variation data which include different identification information embedded therein and are decryptable using different keys and the common segment region including the single data are provided, and a plurality of reproduction paths according to variation data to be selected is settable is generated in an information processing device such as a content editing device or a content generating device. The generated content is recorded in the information recording medium by an information processing device including a recording unit.

A data processing unit of the information processing device such as the content editing device or the content generating device generates content in which each piece of variation data is configured with segmented data in units of aligned units specified in the MPEG-2 TS format, and the variation data identifier is recorded in the adaptation field of the source packet at the head of each aligned unit as the plain text data.

Further, at the time of the content generation process, the data processing unit records the variation data identifier in the plain text data region set in the head region of the aligned unit. Furthermore, the data processing unit performs the process of setting the source packet set in the head region of the aligned unit as the source packet including no PCR time stamp.

The content generated as described above is recorded in an information recording medium through an information processing device including a data recording unit.

[10. Exemplary Hardware Configuration of Information Processing Device]

Next, an exemplary hardware configuration of the information processing device that performs the process of reproducing the content having the configuration described in the above embodiment, the process of generating the content, or the process of recording the content will be described with reference to FIG. 26.

A central processing unit (CPU) 501 functions as the data processing unit that performs various kinds of processes in accordance with programs stored in a read only memory (ROM) 502 or a storage unit 508. For example, the process according to the sequence described in the above embodiment is performed. A random access memory (RAM) 503 stores programs, data, and the like executed by the CPU 501. The CPU 501, the ROM 502, and the RAM 503 are connected to one another via a bus 504.

The CPU 501 is connected to an input/output interface 505 via the bus 504, and an input unit 506 including various switches, a keyboard, a mouse, a microphone, or the like and an output unit 507 including a display, a speaker, or the like are connected to the input/output interface 505. The CPU 501 performs various kinds of processes in accordance with a command input from the input unit 506, and outputs a processing result to, for example, the output unit 507.

A storage unit 508 connected to the input/output interface 505 includes, for example, a hard disk or the like, and stores programs executed by the CPU 501 and various kinds of data. A communication unit 509 functions as a transceiving unit for data communication via a network such as the Internet or a local area network (LAN) and a transceiving unit for broadcast waves, and performs communication with an external device.

A drive 510 connected to the input/output interface 505 drives a removable medium 511 such as a semiconductor memory such as a magnetic disk, an optical disk, a magneto-optical disk, or a memory card, and records or reads data.

Further, encoding or decoding of data can be performed as the process of the CPU 501 serving as the data processing unit, but a codec serving as dedicated hardware for performing the encoding processing or the decoding process may be provided.

[11. Conclusion of Configuration of Present Disclosure]

The embodiments of the present disclosure have been described above in detail with reference to the specific examples. However, it is obvious that those skilled in the art can make modifications and substitutions of the embodiments without departing from the gist of the present disclosure. In other words, the present invention has been disclosed in the form of exemplification, and should not be interpreted restrictively. In order to determine the gist of the present disclosure, claims set forth below should be taken into consideration.

Further, the technology disclosed in this specification may have the following configurations.

(1) An information processing device, including:

a data processing unit that performs a reproducing process for content, wherein the content includes an individual segment region configured with a plurality of pieces of variation data that include different identification information embedded therein and are decryptable using different keys and a common segment region configured with single data, each piece of the variation data is configured with segmented data in units of aligned units specified in an MPEG-2 TS format, the data processing unit is configured to calculate a reproduction path by applying a device key held in a memory, sequentially select an aligned unit corresponding to one piece of variation data corresponding to the reproduction path from a plurality of aligned units constituting a plurality of pieces of variation data in the individual segment region, and reproduce the selected aligned unit, the data processing unit selects the aligned unit corresponding to the reproduction path on the basis of a variation data identifier recorded in an adaptation field in a TS packet header of a first source packet constituting the aligned unit.

(2) The information processing device according to (1), wherein the data processing unit acquires the variation data identifier from a plain text data region set in a head region of the aligned unit.

(3) The information processing device according to (1) or (2), wherein a source packet set in a head region of the aligned unit is a source packet including no program clock reference (PCR) time stamp, and the data processing unit acquires the variation data identifier from a plain text data region of first 16 bytes of the aligned unit.

(4) The information processing device according to any of (1) to (3), wherein the data processing unit includes a filter processing unit that selects an aligned units belonging to the one piece of variation data corresponding to the reproduction path on the basis of the variation data identifier.

(5) The information processing device according to any of (1) to (4), wherein the data processing unit decrypts encrypted data stored in the aligned unit corresponding to the one piece of the variation data corresponding to the reproduction path selected from the individual segment region using a segment key acquired from a segment key file.

(6) The information processing device according to any of (1) to (5), wherein the variation data identifier recorded in the adaptation field in the TS packet header of the first source packet constituting the aligned unit has a configuration capable of recording at least three or more types of identifiers, and the data processing unit selects an aligned unit having one variation data identifier corresponding to the reproduction path from the three or more types of variation data identifiers.

(7) An information recording medium having content stored as record data therein, the content including an individual segment region configured with a plurality of pieces of variation data that include different identification information embedded therein and are decryptable using different keys and a common segment region configured with single data, a plurality of reproduction paths according to variation data to be selected being settable in the content, wherein each piece of the variation data is configured with segmented data in units of aligned units specified in an MPEG-2 TS format, and a variation data identifier is recorded in an adaptation field of a first source packet of each aligned unit as plain text data, and the information recording medium enables a reproducing device to select the aligned unit corresponding to the reproduction path on the basis of the variation data identifier recorded in the adaptation field in a TS packet header of the first source packet constituting the aligned unit and perform content reproduction.

(8) The information recording medium according to (7), wherein a source packet set in a head region of the aligned unit is a source packet including no program clock reference (PCR) time stamp, and the information recording medium enables the reproducing device to acquire the variation data identifier from a plain text data region of first 16 bytes of the aligned unit.

(9) An information processing device, including:

a data processing unit that generates content in which an individual segment region including a plurality of pieces of variation data which include different identification information embedded therein and are decryptable using different keys and a common segment region including single data are provided, and a plurality of reproduction paths according to variation data to be selected is settable, wherein the data processing unit generates content in which each piece of variation data is configured with segmented data in units of aligned units specified in an MPEG-2 TS format, and a variation data identifier is recorded in an adaptation field of a first source packet of each aligned unit as plain text data.

(10) The information processing device according to (9), wherein the data processing unit records the variation data identifier in a plain text data region set in a head region of the aligned unit.

(11) The information processing device according to (9) or (10), wherein the data processing unit performs a process of setting a source packet set in a head region of the aligned unit as a source packet including no program clock reference (PCR) time stamp.

(12) The information processing device according to any of (9) to (11), further including, a data recording unit that records the content generated by the data processing unit in an information recording medium.

(13) An information processing method performed in an information processing device, the information processing device including a data processing unit that performs a process of reproducing content, the content including an individual segment region configured with a plurality of pieces of variation data that include different identification information embedded therein and are decryptable using different keys and a common segment region configured with single data, each piece of the variation data being configured with segmented data in units of aligned units specified in an MPEG-2 TS format, the information processing method including:

calculating, by the data processing unit, a reproduction path by applying a device key held in a memory;

performing, by the data processing unit, a process of sequentially selecting an aligned unit corresponding to one piece of variation data corresponding to the reproduction path from a plurality of aligned units constituting a plurality of pieces of variation data in the individual segment region and reproducing the selected aligned unit; and selecting, by the data processing unit, the aligned unit corresponding to the reproduction path on the basis of a variation data identifier recorded in an adaptation field in a TS packet header of a first source packet constituting the aligned unit.

(14) An information processing method performed in an information processing device, the information processing device including a data processing unit that performs a content generation process, the information processing method including:

generating, by the data processing unit, content in which an individual segment region including a plurality of pieces of variation data which include different identification information embedded therein and are decryptable using different keys and a common segment region including single data are provided, and a plurality of reproduction paths according to variation data to be selected is settable; and generating, by the data processing unit, content in which each piece of variation data is configured with segmented data in units of aligned units specified in an MPEG-2 TS format, and a variation data identifier is recorded in an adaptation field of a first source packet of each aligned unit as plain text data.

(15) A program causing an information processing device to perform information processing, the information processing device including a data processing unit that performs a process of reproducing content, the content including an individual segment region configured with a plurality of pieces of variation data that include different identification information embedded therein and are decryptable using different keys and a common segment region configured with single data, each piece of the variation data being configured with segmented data in units of aligned units specified in an MPEG-2 TS format, the program causing the information processing device to perform:

a process of calculating, by the data processing unit, a reproduction path by applying a device key held in a memory;

a process of performing, by the data processing unit, a process of sequentially selecting an aligned unit corresponding to one piece of variation data corresponding to the reproduction path from a plurality of aligned units constituting a plurality of pieces of variation data in the individual segment region and reproducing the selected aligned unit; and a process of selecting, by the data processing unit, the aligned unit corresponding to the reproduction path on the basis of a variation data identifier recorded in an adaptation field in a TS packet header of a first source packet constituting the aligned unit.

(16) A program causing an information processing device to perform information processing, the information processing device including a data processing unit that performs a content generation process, the program causing the information processing device to perform:

generating, by the data processing unit, content in which an individual segment region including a plurality of pieces of variation data which include different identification information embedded therein and are decryptable using different keys and a common segment region including single data are provided, and a plurality of reproduction paths according to variation data to be selected is settable; and generating, by the data processing unit, content in which each piece of variation data is configured with segmented data in units of aligned units specified in an MPEG-2 TS format, and a variation data identifier is recorded in an adaptation field of a first source packet of each aligned unit as plain text data.

Further, a series of processes described in the specification can be performed by hardware, software, or a combination of both. In the case of performing the process by software, it is possible to install a program including a process sequence recorded therein in a memory in a computer into which dedicated hardware is incorporated and execute the program or install the program in a general-purpose computer capable of performing various kinds of processes and execute the program. For example, the program can be recorded in a recording medium in advance. In addition to installing to a computer from a recording medium, the program can be received via a network such as a LAN, the Internet, or the like and installed on a recording medium such as an internal hard disk.

Further, various kinds of processes described in the specification may be performed chronologically in accordance with the description or may be performed in parallel or individually in accordance with a processing capability of a device that performs a process or as necessary. Further, in this specification, a system refers to a logical aggregate configuration of a plurality of devices and not limited to a configuration in which devices of respective components are accommodated in the same housing.

INDUSTRIAL APPLICABILITY

As described above, according to the configuration of one embodiment of the present disclosure, a configuration capable of performing reliable source analysis of illegal copy content using content in which a reproduction path settable.

Specifically, content in which the individual segment region including a plurality of pieces of variation data which include different identification information embedded therein and are decryptable using different keys and the common segment region including the single data are provided, and the variation data is configured with the aligned unit is set. The content reproducing device calculates the reproduction path by applying the device key and selects and reproduces the aligned unit corresponding to the reproduction path on the basis of the variation data identifier recorded in the adaptation field in the plain text region at the head of a plurality of aligned units constituting the variation data.

Through this configuration, a configuration capable of performing reliable source analysis of illegal copy content using content in which the reproduction path is settable is implemented.

REFERENCE SIGNS LIST

10 Information recording medium
21, 22 Reproducing device
31, 32 Reproduction image
50 Recording device
60 Information recording medium
70 Reproducing device
80 Information recording medium
81 Management information setting unit
82 Data portion
100 Reproducing device
101 Medium IF
102 Filter processing unit
103 Decrypting unit
104 Separating unit
105 Decoding unit
110 Secure memory
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device, comprising:
a data processing unit configured to:
execute a reproducing process for content, wherein
the content includes an individual segment region and a common segment region,
the individual segment region includes a plurality of pieces of variation data that includes different identification information embedded therein,
the plurality of pieces of variation data is decryptable based on different keys,
each piece of the variation data of the plurality of pieces of variation data corresponds to segmented data in units of aligned units; and
the common segment region includes with single data,
calculate a reproduction path based on application of a device key held in a memory,
sequentially select an aligned unit, corresponding to one piece of variation data that corresponds to the reproduction path, from a plurality of aligned units constituting the plurality of pieces of variation data in the individual segment region,
wherein the aligned unit is selected based on a variation data identifier recorded in an adaptation field in a transport (TS) packet header of a first source packet constituting the aligned unit; and
reproduce the selected aligned unit.

2. The information processing device according to claim 1, wherein the data processing unit is further configured to acquire the variation data identifier from a plain text data region set in a head region of the aligned unit.

3. The information processing device according to claim 1, wherein
a source packet set in a head region of the aligned unit is a source packet including no program clock reference (PCR) time stamp, and
the data processing unit is further configured to acquire the variation data identifier from a plain text data region of first 16 bytes of the aligned unit.

4. The information processing device according to claim 1, wherein the data processing unit includes a filter processing unit configured to select the aligned unit belonging to the one piece of variation data corresponding to the reproduction path based on the variation data identifier.

5. The information processing device according to claim 1, wherein the data processing unit is further configured to decrypt encrypted data stored in the aligned unit corresponding to the one piece of variation data corresponding to the reproduction path selected from the individual segment region based on a segment key acquired from a segment key file.

6. The information processing device according to claim 1, wherein
the variation data identifier, recorded in the adaptation field in the TS packet header of the first source packet, constituting the aligned unit has a configuration capable of recording at least three or more types of variation data identifiers, and
the data processing unit is further configured to select the aligned unit having one variation data identifier corresponding to the reproduction path from the three or more types of variation data identifiers.

7. An information recording medium, comprising:
circuitry configured to:
store content as record data, wherein
the content includes an individual segment region and a common segment region, the individual segment region includes a plurality of pieces of variation data that includes different identification information embedded therein,
the plurality of pieces of variation data is decryptable based on different keys,
the common segment region includes with single data, and
store a plurality of reproduction paths settable based on selection of the plurality of pieces of variation data from the content, wherein
each piece of the variation data of the plurality of pieces of variation data corresponds to segmented data in units of aligned units, and
a variation data identifier is recorded in an adaptation field of a first source packet of each aligned unit as plain text data; and
enable a reproducing device to:
select the aligned unit corresponding to a reproduction path of the plurality of reproduction paths based on the variation data identifier recorded in the adaptation field in a transport (TS) packet header of the first source packet constituting the aligned unit; and
execute content reproduction.

8. The information recording medium according to claim 7, wherein
a source packet set in a head region of the aligned unit is a source packet including no program clock reference (PCR) time stamp, and
the information recording medium configured to enable the reproducing device to acquire the variation data identifier from a plain text data region of first 16 bytes of the aligned unit.

9. An information processing device, comprising:
a data processing unit configured to:
generate content that includes an individual segment region and a common segment region, wherein
the individual segment region includes a plurality of pieces of variation data which include different identification information embedded therein,
the plurality of pieces of variation data is decryptable based on using different keys,
the common segment region includes single data,
a plurality of reproduction paths is settable based on a selection of the plurality of pieces of variation data from the content, and
generated content that includes each piece of variation data that corresponds to segmented data in units of aligned units, and a variation data identifier is recorded in an adaptation field of a first source packet of each aligned unit as plain text data.

10. The information processing device according to claim 9, wherein the data processing unit is further configured to record the variation data identifier in a plain text data region set in a head region of the aligned unit.

11. The information processing device according to claim 9, wherein the data processing unit is further configured to execute a process of setting a source packet set in a head region of the aligned unit as a source packet that includes no program clock reference (PCR) time stamp.

12. The information processing device according to claim 9, further comprising,
a data recording unit configured to record the content generated by the data processing unit in an information recording medium.

13. An information processing method, comprising:
in an information processing device:
reproducing, by a data processing unit of the information processing device, content that includes an individual segment region and a common segment region, wherein
the individual segment region includes a plurality of pieces of variation data that include different identification information embedded therein,
the plurality of pieces of variation data is decryptable based on different keys, and
each piece of the variation data of the plurality of pieces of variation data corresponds to segmented data in units of aligned units;
calculating, by the data processing unit, a reproduction path by applying-a device key held in a memory; and
sequentially selecting, by the data processing unit, an aligned unit, corresponding to one piece of variation data corresponding to the reproduction path, from a plurality of aligned units constituting the plurality of pieces of variation data in the individual segment region,
wherein the aligned unit is selected based on a variation data identifier recorded in an adaptation field in a transport (TS) packet header of a first source packet constituting the aligned unit.

14. An information processing method, comprising:
in an information processing device:
generating, by a data processing unit of the information processing device, content that includes an individual segment region and a common segment region, wherein
the individual segment region includes a plurality of pieces of variation data which include different identification information embedded therein,
the plurality of pieces of variation data is decryptable based on different keys,
the common segment region includes single data,
a plurality of reproduction paths is settable based on selection of the plurality of pieces of variation data from the content, and
the generated content includes each piece of variation data that corresponds to segmented data in units of aligned units, and a variation data identifier recorded in an adaptation field of a first source packet of each aligned unit as plain text data.

15. A non-transitory computer-readable medium having stored thereon, computer-executable instructions which, when executed by a computer, cause the computer to execute operations, the operations comprising:
reproducing content that includes an individual segment region and a common segment region, wherein
the individual segment region includes a plurality of pieces of variation data that includes different identification information embedded therein,
the plurality of pieces of variation data is decryptable based on using different keys,
the common segment region includes single data, and
each piece of the variation data of the plurality of pieces of variation data corresponds to segmented data in units of aligned units;
calculating a reproduction path by applying a device key held in a memory;
sequentially selecting an aligned unit, corresponding to one piece of variation data corresponding to the reproduction path, from a plurality of aligned units constituting the plurality of pieces of variation data in the individual segment region,
wherein the aligned unit is selected based on a variation data identifier recorded in an adaptation field in a transport (TS) packet header of a first source packet constituting the aligned unit; and
reproducing the selected aligned unit.

16. A non-transitory computer-readable medium having stored thereon, computer-executable instructions which, when executed by a computer, cause the computer to execute operations, the operations comprising:
generating content that includes an individual segment region and a common segment region, wherein
the individual segment region includes a plurality of pieces of variation data which include different identification information embedded therein,
the plurality of pieces of variation data is decryptable based on different keys,
the common segment region includes single data,
a plurality of reproduction paths is settable based on selection of the plurality of pieces of variation data, and
wherein the generated content includes each piece of variation data that corresponds to segmented data in units of aligned units, and a variation data identifier recorded in an adaptation field of a first source packet of each aligned unit as plain text data.

* * * * *